(12) United States Patent
Janakiraman

(10) Patent No.: US 11,025,588 B2
(45) Date of Patent: Jun. 1, 2021

(54) IDENTIFY ASSETS OF INTEREST IN ENTERPRISE USING POPULARITY AS MEASURE OF IMPORTANCE

(71) Applicant: HEWLETT PACKARD ENTERPRISE DEVELOPMENT LP, Houston, TX (US)

(72) Inventor: Ramsundar Janakiraman, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/177,288

(22) Filed: Oct. 31, 2018

(65) Prior Publication Data

US 2020/0137024 A1  Apr. 30, 2020

(51) Int. Cl.
 *G06F 15/16* (2006.01)
 *H04L 29/12* (2006.01)
 *H04L 29/06* (2006.01)

(52) U.S. Cl.
 CPC ...... *H04L 61/2053* (2013.01); *H04L 61/1511* (2013.01); *H04L 61/2046* (2013.01); *H04L 61/2076* (2013.01); *H04L 63/0281* (2013.01); *H04L 63/126* (2013.01); *H04L 69/22* (2013.01)

(58) Field of Classification Search
 CPC ............ H04L 61/2053; H04L 61/1511; H04L 63/126; H04L 61/2076; H04L 69/22; H04L 61/2046; H04L 63/0281
 See application file for complete search history.

(56) References Cited

U.S. PATENT DOCUMENTS

| 9,544,278 | B2 | 1/2017 | Hozza et al. | |
| 9,762,692 | B2 | 9/2017 | Fullagar et al. | |
| 2010/0257024 | A1* | 10/2010 | Holmes | G06Q 30/00 709/245 |
| 2015/0281168 | A1* | 10/2015 | Holloway | H04L 61/1552 709/245 |
| 2016/0301656 | A1* | 10/2016 | Akcin | H04L 61/1511 |
| 2016/0308833 | A1* | 10/2016 | Yu | H04L 63/1425 |

(Continued)

OTHER PUBLICATIONS

Identifying External and Internal Addresses, (Web Page), Retrieved Jun. 26, 2018, 3 Pgs., https://technet.microsoft.com/en-in/library/cc482972.aspx?f=255&MSPPError=-2147217396.

(Continued)

*Primary Examiner* — Padma Mundur
(74) *Attorney, Agent, or Firm* — McDermott Will & Emery

(57) ABSTRACT

A system may retrieve a packet in a network edge of a computer network. The system may identify a source address of the packet and a domain name that is being resolved that is associated with the packet and determining a time to live for the domain name, based at least in part on a record associated with the domain name. The server may further determine a relevance value indicative of an importance of a server associated with the domain name based at least in part on a frequency of the domain name in a domain name system list comprising a plurality of servers associated with a plurality of domain names, wherein the frequency is normalized by the time to live for the domain name. The system may sort the domain name system list according to the relevance value.

19 Claims, 17 Drawing Sheets

(56) References Cited

U.S. PATENT DOCUMENTS

2017/0295196 A1* 10/2017 Arnell ................... H04L 69/40
2017/0339222 A1   11/2017 Newton

OTHER PUBLICATIONS

Wills, C. E. et al., Inferring Relative Popularity of Internet Applications by Actively Querying DNS Caches, (Research Paper), IMC '03 Proceedings of the 3rd ACM SIGCOMM conference on Internet measurement, Oct. 27, 2003 pp. 78-90.
Wikipedia, "SOA Record", available online at <https://en.wikipedia.org/w/index.php?title=SOA_record&oldid=831892718>, Mar. 22, 2018, 3 pages.

* cited by examiner

IDENTIFY ASSETS OF INTEREST IN ENTERPRISE USING POPULARITY AS MEASURE OF IMPORTANCE

BACKGROUND

Technologies for network security and visibility currently deployed tend to either lack enough coverage due to excessive filtering of network traffic by an internet protocol (IP), a subnet, or a virtual, local area network (VLAN) using a domain name service (DNS) or using remote deployments using discovery protocols such as DNS, multicast DNS (mDNS), Simple Service Discovery Protocol (SSDP), Bit-Torrent, and the like to discover network resources, or take too much bandwidth and computational resources from the network. These deficiencies typically arise from insufficient coverage of dynamic network topologies, which demand a constant selection of optimal tapping nodes in the network.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1A:
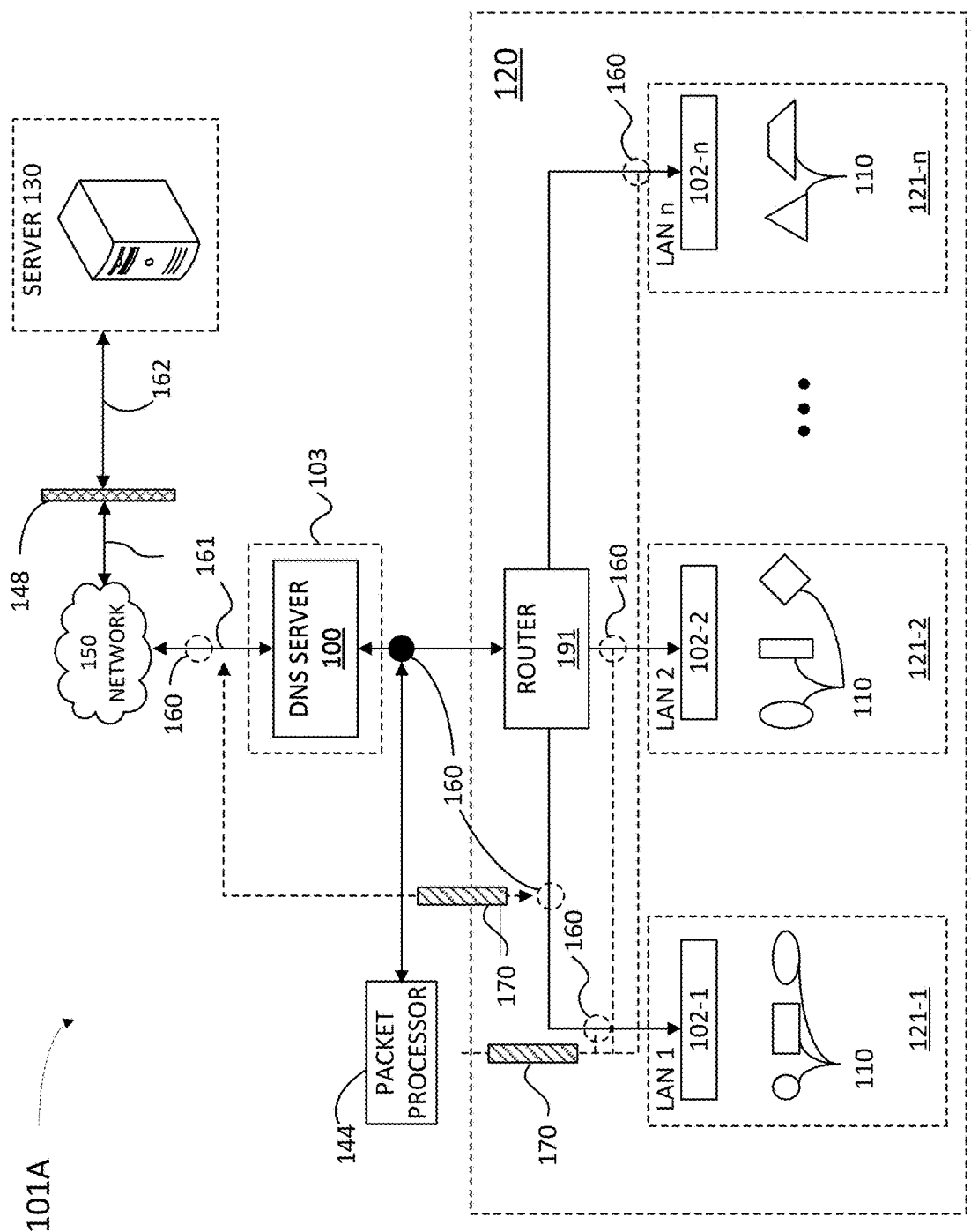
FIG. 1A illustrates an example architecture for using a network edge for behavior analysis and network monitoring and maintenance, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

To address network security and visibility issues, network analytics protocols desirably extract attributes from multiple network layers (e.g., from layer L2 through layer L7), to solve various use-cases. In one approach, an intrusion prevention/detection system (IPS/IDS, which may be part of a continuous security monitoring system) taps a demilitarized zone ("DMZ" e.g., the wireless area network—WAN—uplink), to catch malwares and advanced persistent threats (APTs) during a breach or exfiltration (e.g., FireEye). In a second approach, analytics tools may include packet processors that tap aggregation points in the network to monitor use-cases for visibility and insider threat.

The present disclosure addresses the problem of monitoring, evaluating, and protecting against external network attacks as well as insider threats, which arises in computer network technology. This problem becomes more complex as mobile network devices with high computational capabilities become prevalent, and the network architecture becomes more intricate and interconnected. Consistent with this disclosure, some embodiments collect authenticated, unencrypted low-volume and high value protocol metadata for analytics. Embodiments as disclosed herein provide a technical solution to the above problem by leveraging discovery tools in the network to discover resources. Discovery protocols consistent with the present disclosure may include a dynamic host configuration protocol (DHCP), a domain name service (DNS), a multicast DNS (mDNS) protocol, a link layer discovery (LLDP) protocol, a CISCO discovery protocol (CDP), and many more that are low in volume, but high in information content about the network. Discovery protocols as disclosed herein provide information to the devices to operate in the network that we can leverage in the solution to understand the network layout and the semantics of the resources (like document servers, printers) in the network.

Discovery tools precede access to network resources and comprise a small portion of total network traffic (e.g., 1-2%, or even less). Effect of these tools show up as Discovery Protocol exchanges in the network and which is what we leverage. Accordingly, when data access is encrypted, discovery tools offer the best way to build network context and behavioral profile before accessing the network. In some embodiments, discovery tools remain unencrypted, handling low-volume traffic with high-value for monitoring purposes. For enterprise networks, when actors under the guise of authenticated users enact insider threats, embodiments as disclosed herein use discovery tools to provide a view into the network context and the access pattern of external entities.

The techniques disclosed herein may also apply to Zero-Trust Network architectures. Zero-Trust Network architectures provide unique target endpoint addresses for the discovered resources. By listening to discovery traffic, the unique mappings of the target endpoint addresses may be tracked for a variety of purposes. When the techniques disclosed herein are applied to Zero-Trust Network architectures, the IP addresses of the resources may, in some instances, be immaterial because most of the analytics may be based on the identity of the resources, such as the domain names of the resources. Even when such information is used to augment network records such as Netflow or EFlow, which are network records with deep DPI information, any traffic to the resolved IP addresses may be mapped to resources and used to monitor behavior of the resources.

To accommodate for the diversity and variability of network topologies, it is desirable for data analytics to tap onto network nodes, including rendezvous points of maximal network visibility. Embodiments as disclosed herein achieve two high-level objectives in network data collection for analytics: network health (e.g., data fidelity of the data with respect to use cases) and efficiency. Network health may be addressed with either a switch port analyzer (SPAN) configuration or a test access point (TAP) configuration, for traffic tests, typically including traffic volume issues. Network efficiency addresses where in the network and what type of information to capture so that the traffic tap efficiently resolves the issues that may arise (connectivity, malware and other attacks, and the like).

To test for some of the network health issues, some approaches tap into a network node handling a high volume of traffic. However, a simple mirror maps a full-duplex (e.g., transmission, Tx, and reception, Rx) channel to a half-duplex link (e.g., Tx or Rx). In such configurations, flow control strategies may be desirable to understand what information is dropped from the analysis.

For example, SPAN filters may not fully mitigate bandwidth limitation for aggregated network layers. Accordingly, deep packet inspection (DPI) extraction on SPAN configurations may involve sophisticated techniques to avoid gross inconsistencies, especially from random tail drops. Some examples may include virtual-LAN (VLAN) filters, where the protocol includes multiple ports. When used in routers, VLAN filters in SPAN-ed traffic includes only one direction of a protocol exchange due to Cross-VLAN routing. Some examples include IP prefix filters in routing scenarios, as packets get routed across VLANs. In absence of stateful flow tables, every IP prefix would be configured as source and destination on all the uplinks, creating severe bandwidth constraints as well as resource constraints due to extensive TAP configuration. Some embodiments include filtering of traffic in SPAN configurations to avoid switch port saturation. The traffic filtering is performed carefully to also avoid creating inconsistencies in DPI attributes at various levels, which may lead to iterative loops and a lag in network diagram updates. This is a problem to start with as well. Outdated diagrams lead to bad TAP decisions also causing iteration loops In addition to network health issues, finding an optimal location for tap points in the network may be complicated by the presence of proxies, e.g., network address translation (NAT) and DNS proxy servers such that IP endpoints may not reflect "true" endpoints in the network traffic. Thus, embodiments as disclosed herein provide a more robust association between the analytics results and network endpoints, which is desirable for an accurate evaluation of the network health and efficacy.

Embodiments as disclosed herein bring the data analytics tap points closer to the network edge, in order to provide greater network visibility, such as for discovery protocols that are not routed beyond the network edge. Situating the tap points closer to the network edge, when combined with filtering techniques from a sorted DNS list, may provide a deep insight into network visibility, topology discovery, and security. Typically, the DNS is used to identify malware and a dynamic host configuration protocol (DHCP) is used for client fingerprinting. While this approach generalizes resource discovery and behavioral analysis for insider-threat scenarios, embodiments as disclosed herein leverage the two resources (e.g., discovery protocols DNS and DHCP) with each other, to obtain better results in terms of bandwidth and network security.

Network administrators monitor data traffic to identify anomalies and deficiencies before major problems arise, e.g., loss of connectivity or network services for a client device in a wireless network (e.g., Wi-Fi and the like), or a local area network (LAN), or the spread of malware, data theft, security breaches, and the like. In embodiments as disclosed herein, discovery tools enable a network administrator to identify relevant servers within a network that provide high value data throughput according to the traffic levels and connectivity associated with the server. Embodiments as disclosed herein use a domain name service (DNS) and a dynamic host configuration protocol (DHCP) to provide a mapping of domain names into server addresses. Some embodiments enable the inference of user subnets and default domain suffix like auroranetworks.com or hpe.com (which provides aurora and hpe as keywords to use to find all the enterprise domains in the collected network data). Embodiments as disclosed herein apply data analytics to a small portion of the traffic associated with relevant servers in a network, to have an accurate evaluation of the network health at a low cost in terms of resources and bandwidth used in data analytics. In addition, some embodiments enhance this data analytics capacity at the network edge, e.g., selectively analyzing data traffic through end user client devices, e.g., mobile devices in a LAN.

Data analytics tools and network architectures as disclosed herein provide a competitive differentiation in the field of network analysis and management because they leverage edge device features (e.g., centralized configuration) to obtain high quality data for analytics (e.g., low volume and high relevance). Tools and architectures disclosed herein provide minimal network footprint by deploying fewer packet processing devices at strategic points in the network architecture. Furthermore, by leveraging edge device features, some embodiments offer a simple deployment and configuration procedure. In some embodiments, the network records related to the access of the network resource are left untouched. Further, some embodiments use the discovery of the network resource as seen from discovery protocol exchanges on the network. Some embodiments include deep meta-data from DHCP and DNS protocols (or any other discover protocol) to enhance the value of the existing data sources. In some embodiments, the DHCP provides the default domain suffix or a list of domain suffices to attach to DNS resolutions when not qualified with full domain in the browser. For example, if a user types "platter," the default domain is used to fill in to generate "platter.auroranetworks.com" which is later resolved to an IP address. Some embodiments extract a default domain list information from the suffix(ices) is the enterprise keyword(s).

In some embodiments, DNS updates happen in the internal DNS registry (or primary DNS server). For example, adding new IP addresses to DNS bindings is reflected in the DNS responses for queries to the DNS server. The additional IP address in the internal DNS registry is the new information leveraged by following the discovery process of the devices as the packets of these protocols travels through the network.

In one embodiment of the present disclosure, a computer-implemented method includes retrieving a packet in a network edge of a computer network. The method further includes identifying a source address of the packet and a domain name that is being resolved that is associated with the packet. The method further includes determining a time to live (TTL) for the domain name based at least in part on a record associated with the domain name. The method further includes determining a relevance value indicative of an importance of a server associated with the domain name based at least in part on a frequency of the domain name in a domain name system list comprising a plurality of servers associated with a plurality of domain names, wherein the frequency is normalized by the TTL for the domain name. The method further includes sorting the domain name system list according to the relevance value.

According to one embodiment, a system is described that includes a memory storing instructions and one or more processors configured to execute the instructions to cause the system to: retrieve a packet in a network edge of a computer network; identify a source address of the packet and a domain name that is being resolved that is associated with the packet; determine a time to live (TTL) for the domain name, based at least in part on a record associated with the domain name; determine a relevance value indicative of an importance of a server associated with the source address based at least in part on a frequency of a domain name in the domain name system list associated with the packet, wherein the frequency is normalized by the TTL for the domain name; and sort the domain name system list according to the relevance value.

According to one embodiment, a non-transitory, machine-readable medium is described that includes instructions, which when executed by one or more processors, cause a computer to perform a method including: retrieving a packet in a network edge of a computer network; identifying a source address of the packet and a domain name that is being resolved that is associated with the packet; determining a time to live (TTL) for the domain name, based at least in part on a record associated with the domain name; determining a relevance value indicative of an importance of a server associated with the source address based at least in part on a frequency of the domain name in a domain name system list comprising a plurality of servers associated with a plurality of domain names, wherein the frequency is normalized by the TTL for the domain name; and sorting the domain name system list according to the relevance value.

In yet other embodiment, a system is described that includes a means for storing commands and a means for executing the commands causing the system to perform a method. Either of the means for storing commands and the means for executing commands may be part of a client device or a DNS server. More generally, the means for storing commands and the means for executing commands may be part of a tool configured to execute and carry out protocols as disclosed herein. The method includes retrieving a packet in a network edge of a computer network. The method further includes identifying a source address of the packet and a domain name that is being resolved that is associated with the packet. The method further includes determining a time to live (TTL) for the domain name, based at least in part on a record associated with the domain name. The method further includes determining a relevance value indicative of an importance of a server associated with the source address based at least in part on a frequency of the domain name in a domain name system list comprising a plurality of servers associated with a plurality of domain names, wherein the frequency is normalized by the TTL for the domain name. The method further includes sorting the domain name system list according to the relevance value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1A illustrates an example network architecture 101A suitable for a remotely controlled DNS server installation, according to some embodiments. Network architecture 101A includes server 130, DNS server 100, and client device 110 connected over a network 150, and DNS server 100 hosting client device 110. Furthermore, DNS server 100 may include a DNS proxy, or an access point (AP, or instant AP—IAP—) 102-1, 102-2, through 102-n (hereinafter, collectively referred to as APs 102) for LAN 121-1, 121-2 through 121-n (hereinafter, collectively referred to as "LAN 121"), respectively. Server 130, DNS server 100, and client device 110 include memory circuits storing instructions which, when executed by one or more processors, cause server 130, DNS server 100, and any one of client devices 110 to perform at least some of the steps in methods as disclosed herein. In some embodiments, a processor in client device 110 is configured to execute instructions in an application stored in a memory of client device 110. In some examples, DMZ 103 may include DNS server 100 or any other suitable server or device and may perform at least some of the techniques described herein with respect to DNS server 100.

LAN 121 may be installed in retail a store, a business (e.g., restaurants, shopping malls, and the like), a factory, an office building, and the like. In that regard, LAN 121 may include one or more of DNS servers 100. Moreover, different DNS servers 100 may have different configuration settings in terms of requirements and capabilities, access and privileges, based on the specification of LAN 121, and intended purpose. Network 150 can include, for example, a wide area network (WAN), the Internet, and the like. In some embodiments (e.g., when DNS server 100 is a retail store, a business, factory, or other workplace), one or more LANs 121 may include a manager subnetwork (e.g., chief executives, internet technology—IT—department, and the like), an Employee subnet, or a visitor subnetwork (e.g., for the customers in a retail store or restaurant, or visitors—e.g., vendors—into a company building), each subnetwork having specific resources, attributes, and privileges. In some embodiments, APs 102 may be branch office controllers (BoCs) controlling access to an office or business LAN by client devices 110. Further, network 150 and LAN 121 can include, but are not limited to, any one or more of the following network topologies, including a bus network, a star network, a ring network, a mesh network, a star-bus network, tree or hierarchical network, and the like.

Client devices 110 may include a desktop, a laptop, or a mobile device such as a smart phone, a tablet, or any other portable computing device capable to communicate with server 130 through network 150 and with DNS server 100 through LAN 121. In that regard, client device 110 may include several types of devices, which, even in the case that client device 110 is mobile, may be loosely or less often associated or co-located with a user. Another type of client device 110 may be more often or almost always associated or co-located with a user (e.g., a smart phone or another wearable device).

DNS server 100 may be any device used to handle data communication for LAN 121, e.g., a node, a switch, a multiplexer, or a router. In that regard, DNS server 100 may include any one of a wired terminal (e.g., a copper cable, a fiber optic cable), or a wireless and/or Internet of Things (IoT) terminal (e.g., Wi-Fi, Bluetooth, Zigbee, cellular network, and the like), or any combination thereof. Accordingly, DNS server 100 may be communicatively coupled with server 130 through network 150, and with client devices 110 through a router 191 and APs 102. In that regard, APs 102 may include instant access points (IAPs) that can act as virtual controllers, routers, hubs, network switches, wireless controllers, and the like. A firewall 148 may encrypt data transmission between server 130 and DNS server 100, through network 150. Accordingly, data 161 accessing router 191 through DNS server 100 or LANs 121 may be unencrypted, and data 162 accessing server 130 may be encrypted.

Network architecture 101A may include tap points 160 (e.g., between DNS server 100 and router 191), to monitor, from a packet processor 144, all network devices and data between tap points 160 and client devices 110 includes a "network edge" 120. Alternatively, one or more tap points 160 may be placed at any point in network 150 between DNS server 100 and firewall 148, or within network edge 120, before any one (or each of) APs 102 (as illustrated with dashed lines), via a SPAN tunnel 170. In some examples, tap points 160 may be placed between router 191 and each of LANs 121-1 to 121-n to provide visibility (e.g., to packet processor 144 via SPAN tunnels) of source IPs and/or discovery protocol data traffic that are not routed beyond the router due to the nature of the discovery protocol or due to the broadcast discovery technique. In some examples, placing tap points 160 between router 191 and each of LANs 121-1 to 121-n may enable snapshotting of packets prior to any network address translation performed by router 191, thereby preserving the client IP and the frequency of resolution by each client. In some examples, such SPAN tunnels (e.g., SPAN tunnel 170) may connect router 191 to tap points 160, such as when LANs 121 are switched. Network edge 120 provides predictable endpoints, e.g., tap points 160, from where to extract sample packets with a packet processor 144. Network edge 120 is a sensitive area where the pulse of network architecture 101A may be accurately registered and diagnosed. Network topology is highly dynamic (e.g., transient) on network edge 120; accordingly, tap points 160 enables packet processor 144 to determine how edge devices (e.g., APs 102 and client devices 110) continue to connect, authenticate, and access to perform routine functions. Accordingly, embodiments as disclosed herein include accurately determining the number and location of tap points 160 to handle network volume. Some embodiments include the use of discovery tools, which operate within network edge 120 and provide high-value, but low volume data traffic. Thus, in some embodiments, packet processor 144 uses discovery tools in addition to deep packet inspection metadata extraction operations to handle network analysis before the first hop protocols seen at the level of Network edge 120. Access to this is obtained by either configuring 102-1 thru n or Router 191 to locally SPAN to a co-located 144 or remote SPAN through a network to 144 setup remotely but routable (e.g., into DNS server 100 and through firewall 148). This approach substantially reduces the bandwidth strain imposed in network resources by typical network analysis devices. In some embodiments, packet processor 144 may absorb less than 0.05% to 1% of the network traffic volume, opening up a wide bandwidth for other network resources and/or compute/storage resources. For instance, storage resources with the capacity to store a month of data collected via previous techniques may be able to store two years of data collected via the present techniques.

In some embodiments, packet processor 144 uses a DHCP to discover a network ID and other resources in a DNS (e.g., cloud-n-closet resources, and the like). DHCP responses provide the IP address with subnetwork information including DNS server 100 and router 191 for the subnetworks, and use limited bandwidth. Additional options and extensions to these protocols provide desirable information like default internal domain(s). Request and response commands from discovery tools can provide how often the addresses circulate when analyzed over time, e.g., to identify oversubscribed addresses. In some embodiments, packet processor 144 uses a DHCP to identify specific subnetworks within LANs 121 (e.g., employee subnetwork v. visitor's subnet) and configure network architecture 101A to send selective configuration protocols from the identified subnetworks to further reduce the level of data collected and provide a cost effective network analysis. Further, in some embodiments, packet processor 144 may select specific subnetworks and user authenticated roles from which to capture traffic (e.g., leave out visitor subnetworks and collect only employee subnetworks or CEO subnetworks).

In some embodiments, packet processor 144 inspects the discovery traffic initiated by client device 110 to discover the network resources with an application layer protocol (APP) or browser-based application installed in client device 110. The same application that discovers the network resources may initiate hypertext transfer protocol (HTTP), or HTTP-secure (HTTPS) or other application protocol to access the network resource from client device 110. DNS server 100 provides a DNS to the operating system of client devices 110, to map a network resource name configured in the APP to an IP address in network architecture 101A. In some embodiments, DNS server 100 transmits resolution requests to client devices 110 through DNS responses.

Other protocols that packet processor 144 may use include a multicast DNS protocol (mDNS) to resolve host names to IP addresses, or a simple service discovery tool (SSDP) for resources co-located at the edge (e.g., plug and play devices, and the like). More specifically, some embodiments use the request part of discovery tools (e.g., protocols including memory devices storing commands and processors to execute the commands) for identification/discovery of client devices 110, which are typically multicast, thereby facilitating access to at least one copy. The host responses (or server/protocol proxy node's responses) carry equally critical info that provide the "network view," but may involve more network resources to track.

In some embodiments, networks indicated by LANs 121 may include secure encapsulation (e.g., a secure shell—SSH—, or Secure Socket Layer—SSL—) and internet-protocol-secure (IPSec) tunnels, to access DNS server 100. In some embodiments, encapsulation includes encrypted transport like secure sockets layer (SSL). In some embodiments, APs 102s may transmit a copy of the discovery protocols through remote SPAN routed through these secure tunnels.

While the access may be encrypted, the resolution (metadata) may stay in clear, authenticated, or hashed text, to protect from tampering, still enabling metadata extraction by packet processor 144.

Encapsulation 170 first resolves the host name of DNS server 100 before initiating the SSH session. Accordingly, in some embodiments, packet processor 144 tracks resolution in the traffic at tap points 160 to track access to DNS server 100. In some embodiments, packet processor 144 may also be configured to track responses to requests from client devices 110, which carry key information about the network view. Other discovery requests from client devices 110 may include SSDP, LLDP, or BitTorrent discovery that identifies the seed for a torrent content in the BitTorrent protocol (which identifies content by URL prior to transmission).

Figure 1B:
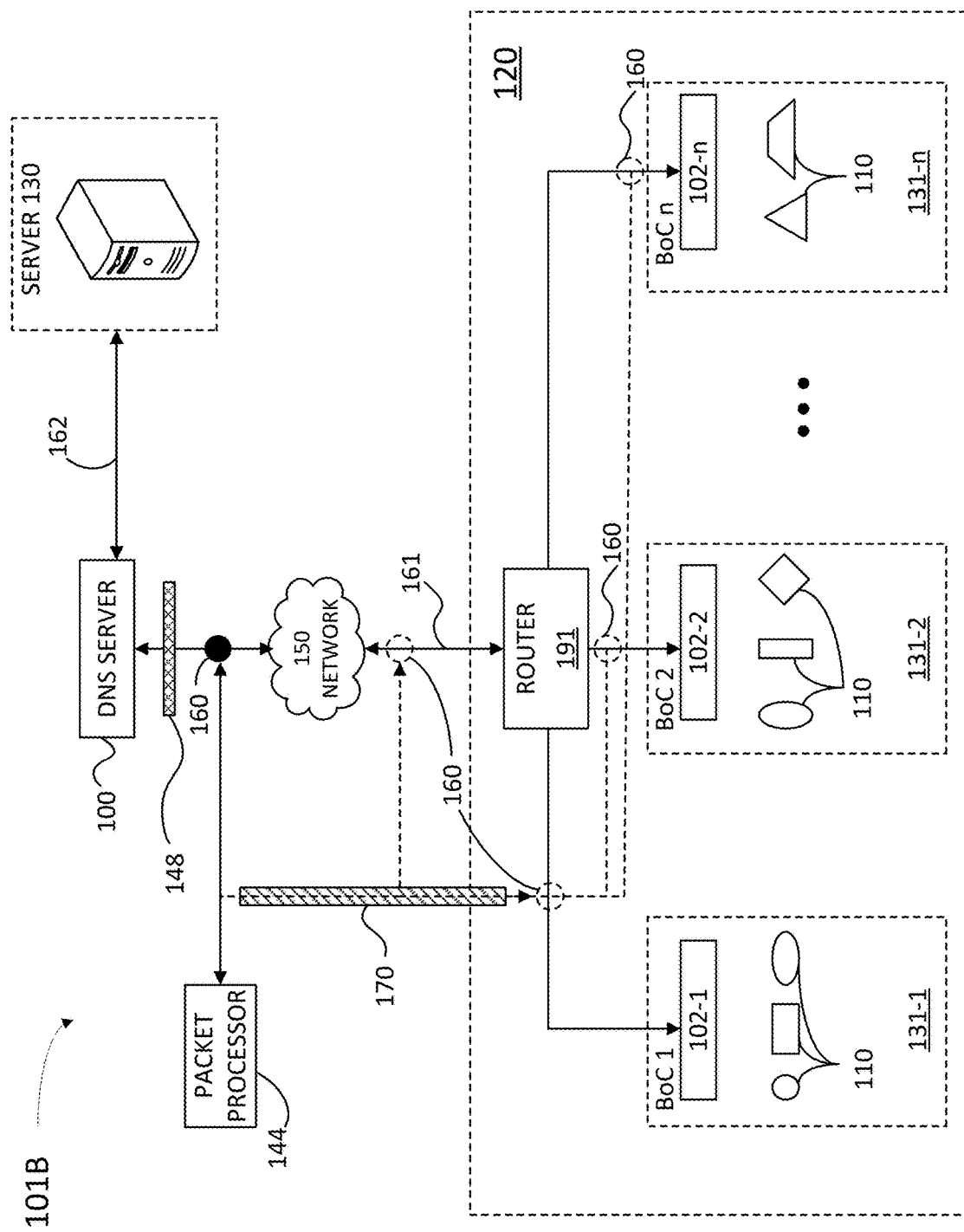
FIG. 1B illustrates an example architecture for using a remote network edge for behavior analysis and network monitoring and maintenance, according to some embodiments.

FIG. 1B illustrates an example network architecture 101B suitable for a remotely controlled DNS server installation, according to some embodiments. Network architecture 101B includes server 130, DNS server 100, and client device 110 connected over a network 150, and DNS server 100 hosting client device 110. In some examples, DNS server 100 may be located in network 150 or within LAN 120. Furthermore, DNS server 100 may include a DNS proxy, or an access point (AP, or instant AP—IAP—) 102-1, 102-2, through 102-n (hereinafter, collectively referred to as APs 102) for branch office controllers (BoC) 131-1, 131-2 through 131-n (hereinafter, collectively referred to as "BoCs 131"), respectively. BoCs 131 may be remote network configurations that communicate with DNS server 100 through network 150. Network architecture 101B may include tap points 160, a packet processor 144, a router 191 and a network edge 120, as described in detail in reference to FIG. 1A. In some examples, BOC 131-1 may include virtual private network (VPN) capable of SPANing traffic based on the filter configuration or deep packet inspection smart filtering sent from a central configuration server. A firewall 148 may protect DNS server 100 from public traffic in network 150, and encapsulation 170 establishes a SSH between an AP in one of BoCs 131 and packet processor 144. Data 161 accessing router 191 through network 150 may be unencrypted, and data 162 accessing server 130 may be encrypted Server 130, DNS server 100, and client device 110 include memory circuits storing instructions which, when executed by one or more processors, cause server 130, DNS server 100, and any one of client devices 110 to perform at least some of the steps in methods as disclosed herein. In some embodiments, a processor in client device 110 is configured to execute instructions in an application stored in a memory of client device 110.

Figure 2:
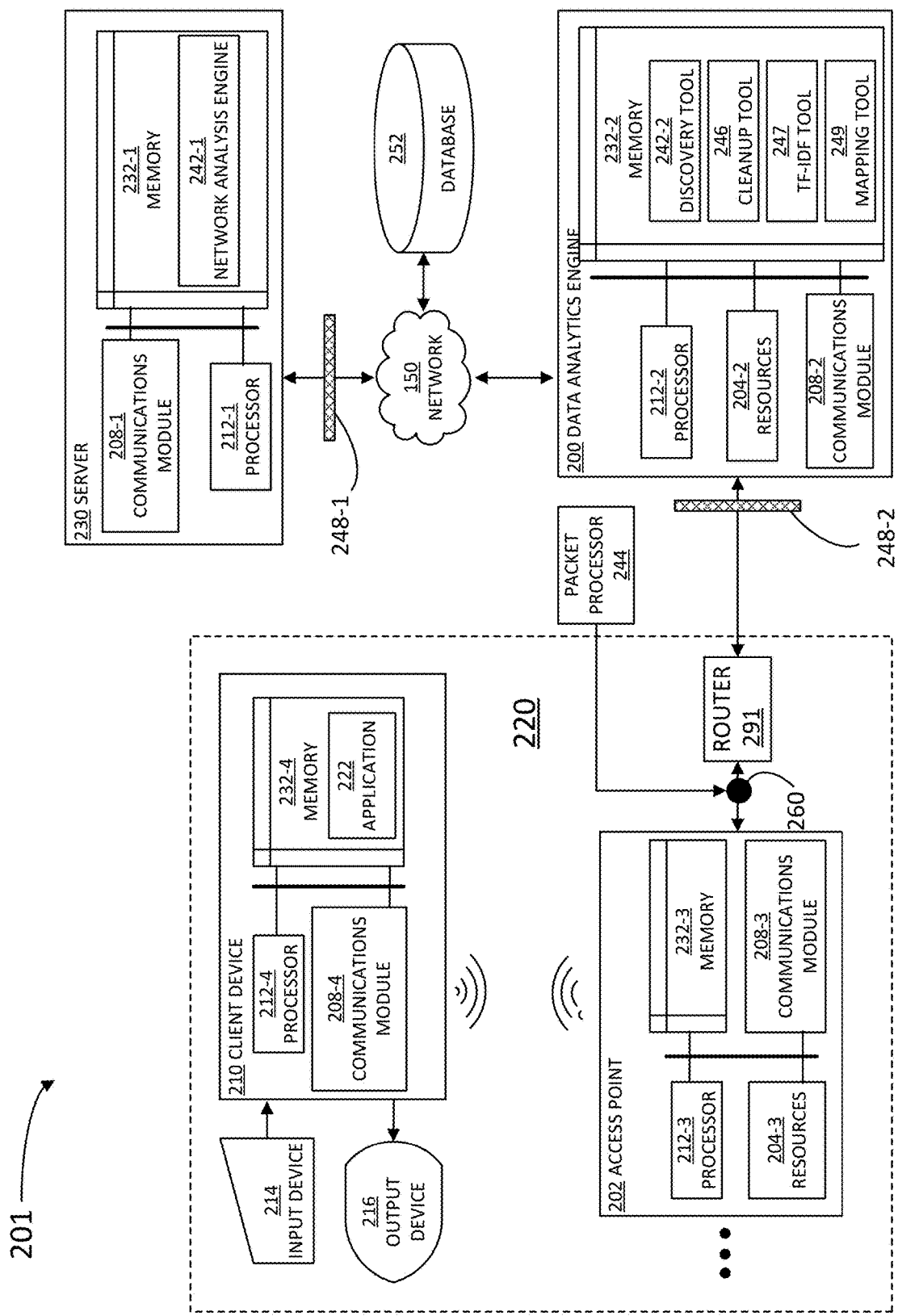
FIG. 2 is an architecture illustrating example data analytics engine and a client device from the architecture of FIG. 1, according to certain aspects of the disclosure.

FIG. 2 is a network architecture 201 illustrating details of server 230, data analytics engine 200, access point 202, and client device 210 (cf. server 130, DNS server 100, AP 102, and client device 110), according to certain aspects of the disclosure. Data analytics engine 200 is communicatively coupled with server 230 over network 150 via communications module 208-1 in server 230 and 208-2 in data analytics engine 200. Data analytics engine 200 may, in some examples, act as or be an DNS data processing server. Firewall 248-1 provides data encryption to traffic flow into server 230, and firewall 248-2 provides data encryption to traffic flow into data analytics engine 200. Firewalls 248-1 and 248-2 will be collectively referred to, hereinafter, as "firewalls 248." Within network edge 220, a router 291 (cf., router 191) directs traffic to access point 202 (cf., AP 102). Access point 202 and client device 210 may be communicatively coupled through communications modules 208-3 and 208-4, respectively, in a LAN hosted by data analytics engine 200 (e.g., LAN 121). Communications modules 208-1, 208-2, 208-3, and 208-4 will be collectively referred to, hereinafter, as "communications modules 208." Communications modules 208 can be, for example, modems or Ethernet cards, and include a wireless communication antenna so that client device 210 can locally interact with data analytics engine 200 through a LAN, or on a device-to-device handshake basis. Communications modules 208 may be configured to execute multiple data and packet transmission protocols, such as user datagram protocol (UDP), transmission control protocol (TCP), stream control transmission protocol (SCTP), and the like. Client device 210 may also be coupled with an input device 214 and an output device 216. Input device 214 may include a mouse, a keyboard, a touchscreen, and the like. Output device 216 may include a display, a touchscreen, a microphone, and the like. In some embodiments, input device 214 and output device 216 may be included in the same unit (e.g., a touchscreen).

Server 230 includes a memory 232-1 and a processor 212-1 in addition to communications module 208-1. Data analytics engine 200 may be one or more server devices and may include a memory 232-2 and a processor 212-2. Access point 202 includes a memory 232-3 and a processor 212-3, wherein memory 232-3 may include installation configuration scripts provided by server 230 and data analytics engine 200. In some examples, components and modules of data analytics engine 200 may be part of and/or execute on processors of any other suitable server or device, such as server 230, packet processor 244, and the like. Client device 210 also includes a memory 232-4 and a processor 212-4, wherein memory 232-4 includes application 222 that may be hosted by any one of access point 202, data analytics engine 200, and server 230. Processors 212-1, 212-2, 212-3, and 212-4 will be collectively referred to, hereinafter, as "processors 212." Memories 232-1, 232-2, 232-3, and 232-4 will be collectively referred to, hereinafter, as "memories 232." Processors 212 are configured to execute instructions, such as instructions physically coded into processors 212, instructions stored in memories 232, or a combination of both. In some embodiments, application 222 in client device 210 may be installed by server 230 and perform scripts and other routines provided by server 230. For example, in some embodiments, client device 210 may be a mobile device (e.g., a smart phone, a tablet, and the like) roaming with the user in and out of a LAN serviced by access point 202 and application 222 may include a tracking application providing a location information of client device 210 to server 230 or to data analytics engine 200. Installation of the tracking application may be performed by data analytics engine 200 or by server 230, upon authorization by the user of client device 210. In that regard, application 222 may include a web-based application that locates and tracks client device 210 through GPS and other hardware and software running over network 150, and hosted by server 230.

In some embodiments, access point 202 also includes resources 204-3 to handle networking operations within a LAN, WLAN, Wi-Fi, Bluetooth, and the like. Resources 204-3 may be selected from resources 204-2 in the DNS server for the specific location of access point 202. Hereinafter, resources 204-2 and 204-3 will be collectively referred to as "resources 204." Resources 204 may include hardware and software components, such as radio-frequency (RF) antennas and controller circuits to scan the LAN serviced by access point 202 and to look for client devices 210 present therein (e.g., using a BLE radio), and the like.

In some embodiments, memory 232-1 includes a network analysis engine 242-1 configured to detect and diagnose network architecture 201. In some embodiments, network analysis engine 242-1 has full access to a database 252. Database 252 may store information related to configuration protocols for data analytics engine 200 and access point 202. In some examples, database 252 may be a distributed network accessible database (e.g., Hadoop-like distributed network accessible database), and server 230 may be a cluster (e.g., Hadoop-like cluster) that can process workflows such as network analysis engine 242-1, discovery tool 242-2, and the like, such that database 252 may be co-located with server 230. Network analysis engine 242-1 may apply machine-learning algorithms (e.g., neural networks, artificial intelligence, and the like) to build multiple user profiles and other network patterns (e.g., identify potentially harmful IP addresses or suspicious traffic behavior) that are stored in database 252. A user profile may include the type of client device 210 used to log into network architecture 201, the data analytics engine 200, and access point 202, and the period of time that the connectivity lasted (latency), patterns of connectivity, and the like. In that regard, database 252 may also include DPI libraries to maintain flow states including handshake states between client devices 210 and access point 202 or data analytics engine 200. In some embodiments, at least a portion of network analysis engine 242 may be deployed within network edge 220 ("on-premises" deployment), or on data analytics engine 200 ("cloud" deployment).

Memory 232-2 may include discovery tool 242-2, such as DHCP, mDNS, SSDP, and the like. In some examples, such tools may include simple programs, Spark, map reduce-like workflows that can run on single or multiple nodes in a distributed fashion, and the like. In that regard, processor 212-2, discovery tool 242-2, cleanup tool 246, tf-idf tool 247, and mapping tool 249 may access database 252 when executing a DHCP protocol. Packet processor 244 may use selective mirroring of discovery tool 242-2 and/or smart mirroring with the deployed models overlaid on network architecture 201, at negligible additional hardware cost. For example, in some embodiments, packet processor 244 may preferably access packets with HTTP/HTTPS headers or Authentication with Certificate exchange to remote location. In that regard, memory 232-2 may include machine-learning and other non-linear algorithms to determine an adaptive mirroring sequence of discovery tool 242-2 that reduces bandwidth cost and increases network visibility (e.g., scope). Memory 232-2 may also include a cleanup tool 246 storing instructions that cause processor 212-2 to process a list of IP addresses retrieved from a discovery tool or from database 252 and add newly added IP addresses or remove obsolete, redundant, or irrelevant IP addresses to form a baseline list of IP addresses to be stored in database 252. In some embodiments, memory 232-2 also includes a term-frequency, inverse document frequency (tf-idf) tool 247 configured to establish a hierarchy in a list of DNS names according to a frequency of usage in network architecture 201. Memory 232-2 may also include a mapping tool 249, including instructions to cause processor 212-2 to map a DNS name to an IP address, per request from one of access point 202, or client devices 210.

In some embodiments, firewalls 248 uses IP Lists or Named Aliases for access control lists (ACLs). Any new service augmented to network architecture 201 with an additional server includes adding a new IP to the baseline list and updating the ACLs with cleanup tool 246. In that regard, processor 212-2 may be configured to leverage a mismatch between a baseline list and an obsolete ACL to probe for vulnerabilities at firewalls 248. In some embodiments, packet processor 244 may be configured to remotely apply SPAN or TAP protocols at tap point 260. The volume of the traffic spanned at tap point 260 is small enough to not choke the network. This is due to first looking at only discovery protocols that form about 0.5% of the traffic, or less. An umbrella filter, which may be applied at a flow level, may cap the amount of discovery protocol data traffic that is looked at to, for example around 5% to guard against unforeseen rogue discovery protocol usage. Thus, architecture 201 obtains an insight of the network condition from the reduced data at tap point 260 before deciding which segments of architecture 201 deserve a more detailed analysis. This formulates an informed selective depth search and diagnostics that uses limited resources and constraints. In some embodiments, packet processor 244 may collect the DNS Max TTL information from inside network edge 220. More generally, TTL information can be requested from DNS server 100 or from data analytics engine 200, which may be an DNS data processing server that can gather data on request from DNS server 100.

In some embodiments, tap point 260 may include a single source of a tunnel, with the tunnel terminating in packet processor 244, and may be configured to perform deep packet inspection (DPI) and collect metadata. Accordingly, in some embodiments, packet processor 244 may include terminating DPI devices or "packet brokers." SPAN traffic generated from network edge 220 is meager, and thus, packet processor 244 access at tap point 260 has a reduced effect on the uplink bandwidth where traffic aggregation occurs, closer to the data collection point (e.g., between firewall 248-1 and server 230). For example, 100 Mega-bits per second (Mbps, or $10^6$ bits per second) of traffic through tap point 260 accrues to about 10 Giga-bits per second (Gbps, or $10^9$ bits per second) of sustained traffic through server 230. Accordingly, operating at 10 Gbps, packet processor 244 in network edge 220 may offer visibility over 1 Tera-bit per second (Tbps, or $10^{12}$ bits per second) of traffic through network architecture 201.

In some embodiments, packet processor 244 is configured to apply smart mirroring techniques over HTTP request/response headers and certificate exchanges in HTTPS sessions (e.g., HTTPS-SSL handshakes), as these components typically include multiple opportunities for finding data fingerprints. Smart mirroring enables handling of high-volume data without absorbing much network bandwidth in network architecture 201. Accordingly, packet processor 244 may be configured to export markers or packets with such headers in HTTP and HTTPS-SSL handshakes as events to a DPI library in database 252, or as packets to packet processor 244 via direct or remote SPAN. For example, in some embodiments, package processor 244 starts by default SPAN/mirroring of packets on the HTTP and HTTPS flows at default ports, e.g., 80, 8080, 8888 for HTTP, and 443, 8443, 4343 for HTTPS. Packet processor 244 stops SPAN/mirroring the packets when the protocols hit a marker in the protocol state machine or at a pre-configured number of initial bytes. In some embodiments, packet processor 244 may also apply markers for protocols with flavors different from default ports, e.g., quick UDP internet connection (QUIC) protocols and (SPDY) protocols.

Network architecture 201 leverages multiple network edges and multiple tap points (e.g., network edge 220 and tap point 260) to reach out to reduced datasets for cost effective solutions to network analysis, diagnosis, and maintenance. When the volume of traffic to analyze goes beyond mirroring (e.g., forwarding) capabilities, data analytics engine 200 applies an iterative deployment model to identify select tap points 260 to deploy new packet processors 244. According to some embodiments, data analytics engine 200 forwards data traffic to packet processor 244 based on the configuration of network architecture 201. Additional protocol data may be obtained from updates to protocol bundles to keep up with changing protocols (e.g., in a DHCP environment). Updates in the configuration protocols may thus involve upgrading the packet processor 244 that has the least activity, thus relaxing further upgrade schedules by data analytics engine 200 and reducing the number and latency of network service downtime. Accordingly, in some embodiments, only a few package processors 244 (e.g., operating as offline devices) require upgrades. In some embodiments, to avoid loss of data, packet processor 244 may be deployed as a virtual router redundancy protocol (VRRP) pair, so that a first packet processor is operative while a second packet processor is upgraded. Additional options may include configuring packet processor 244 as two DPI devices running in parallel for a period of time, exporting duplicate data before a configuration upgrade is initiated. Thus, data from any interrupted flow on a first DPI device is exported by the second DPI device in a wholesome manner. The period of time during which the two DPI devices may run in parallel may be about ten (10) seconds or less, for public internet bound flows, while for internal applications (e.g., application 222 hosted by server 230) it may be minutes.

In some embodiments, network architecture 201 includes an internet-of-things (IoT) configuration. In such scenario, multiple vendors have an aggregation gateway that proxies and exports data (e.g., access point 202). Accordingly, generic gateway devices tend to stay close to and populate network edge 220. Accordingly, network architecture 201 offers an advantageous tap point 260 to tap the data in an IoT environment and tunnel it to packet processor 244 for further processing.

In some embodiments, communications module 208-4 in client device 210 is configured to couple with communications module 208-3 in access point 202 (e.g., APs 102) via a Bluetooth, low energy (BLE) radio interface. In some embodiments, packet processor 244 at tap point 260 is able to catch a reconnaissance attack from an intruder connected through a long-term evolution (LTE) protocol on network edge 220, avoiding firewalls 248. These attacks may target IoT devices in network edge 220 (e.g., client devices 210) through the BLE interface. To address this vulnerability, in some embodiments, access point 202 performs passive listening over network circles of AP BLE devices (e.g., client devices 210) to flag aberrations and other suspicious behavior. In that regard, the proximity and constant exposure of access point 202 (e.g., APs 102) to potentially harmful intruders enables monitoring these intruders through passive promiscuous listening to catch and prevent attacks, without the intruder knowing it is being watched. Performing passive listening as opposed to an active probe may save battery life of client device 210 and/or access point 202. In some instances, passive listening may avoid signaling to malware to be quiet for a period to avoid detection. Passive listening may also enable other devices to perform less work to send responses to, e.g., active probing.

Figure 3:
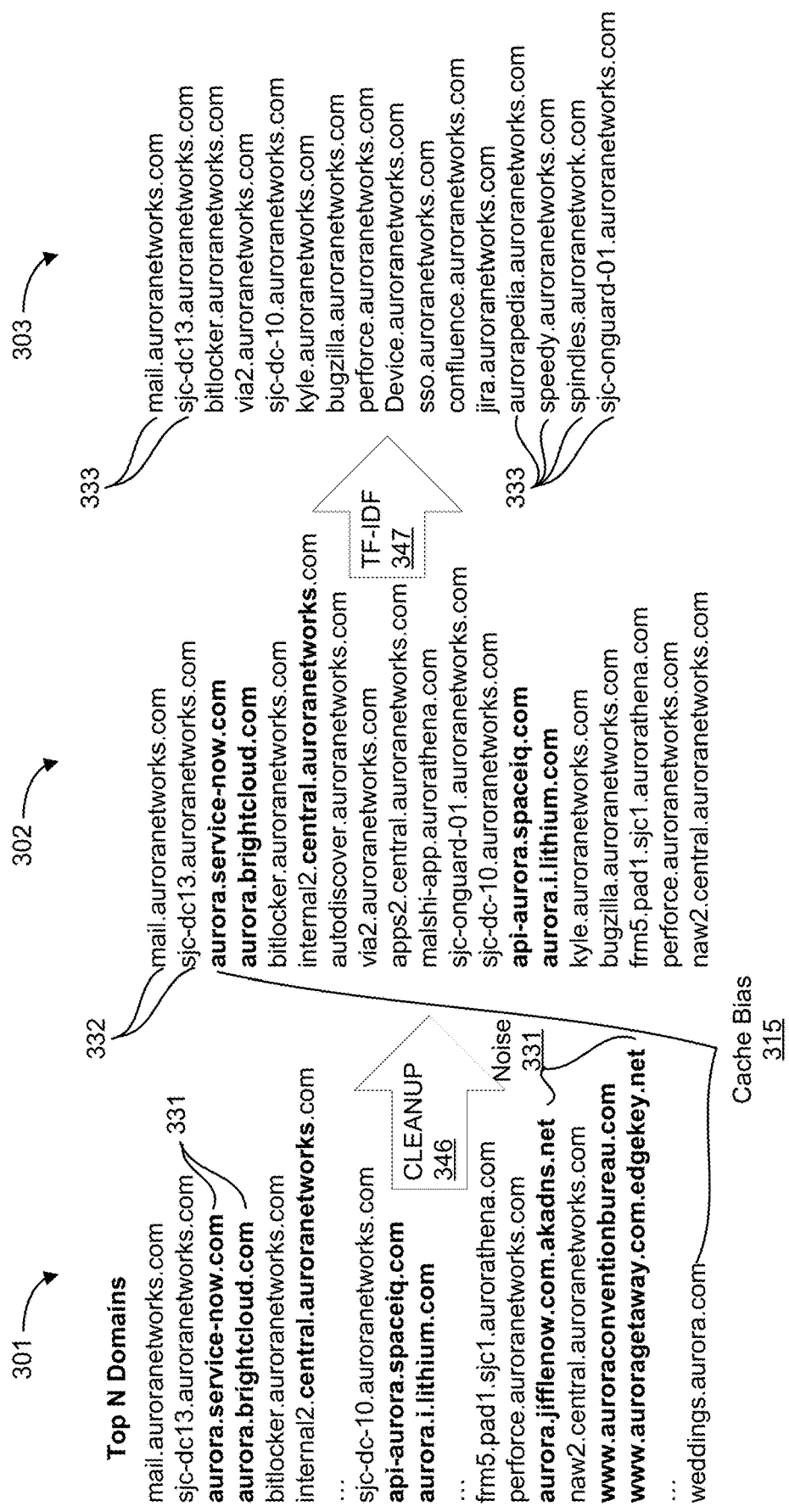
FIG. 3 illustrates a DNS list, modified to identify relevant servers, according to some embodiments.

FIG. 3 illustrates a domain name service (DNS) list 301 including domain names 331, modified to a first list 302 of domain names 332, after a cleanup tool 346, and a normalizer tool 347, which may in some examples may perform tf-idf, to identify relevant domain names 333 in a baseline list 303 (cf. cleanup tool 246 and tf-idf tool 247), according to some embodiments. Baseline list 303 may be created by a DNS server on a network edge for a network architecture using cleanup tool 346, as disclosed herein (cf. DNS data analytics engine 200, network edge 220, and network architecture 201). In the example of FIG. 3, baseline list 303, includes "auroranetworks" domains, which are domains owned by a company called "Aurora Networks". In some embodiments, a natural language tool kit (NLTK) may be used to extract potential domain words pertaining to an enterprise that can be extracted (e.g., XYZ from XYZ networks), and removing words like "networks," "systems," "inc.," and the like. Thus, in the example of "auroranetworks," the NLTK may be used to extract the word "aurora". In some embodiments, in a dynamic enterprise environment, acquisition and mergers may add additional domains, so that cleanup tool 346 may be updated regularly, through a wizard.

In some embodiments, baseline list 303 is obtained from a database of flow records. IP addresses associated with successful resolutions of domains containing the word "aurora" may also be determined from the DNS server because domain names that contain portions of the company name "Aurora Networks" may also be relevant. Such IP addresses may primarily be in internal subnets. Commonly resolved domains in these subnets may lead to additional domains that may contain words associated with other companies acquired by Aurora Networks that still have some existing servers in the network.

The location of packet processors and tap points in network architectures as disclosed herein (e.g., packet processor 244 and tap point 260) provides a wide visibility at the network edge to solve several use-cases with high fidelity. Baseline list 303 may be stored in a database and made accessible to any one of the DNS server and any DNS proxies and client devices in the network edge (e.g., database 252, access point 202, and client devices 210). In some embodiments, forming baseline list 303 includes defining an area of resource identification, behavior profiling, and dynamic configuration management in the desired area (e.g., a network edge, cf. network edges 120 and 220).

In some embodiments, the DNS server creates a baseline list 303 of IP addresses 333, including servers in the network architecture (at least within the network edge). Baseline list 303 is stored in the database for further access by the DNS server or any one of the DNS proxy servers in the network architecture. A cleanup tool 346 is used to remove noise 305 in a DNS list 301. Noise 305 removed by cleanup tool 346 may include compound domains, which are domains where that are in the form of two domain names that are appended together. For example, "aurora.jifflenow.com.akadns.net" may be a compound domain because it is a domain formed from two domains: "aurora.jifflenow.com" and "akadns.net". Similarly, www.auroragateway.com.edgekey.net may be a compound domain because it is a domain formed from two domains: www.auroragateway.com and "edgekey.net". To identify compound domains, domains may be split using top-level domain libraries. If the split domains have suffixes that are common top-level domains such as ".com", ".org", and the like, an entry in DNS list 301 may be discarded.

DNS list 301 may be the result of a discovery operation performed in a prior execution, and may be retrieved from a database. Any changes to DNS list 301 may alter the resulting baseline list 303. The DNS server configures a TTL for a domain name that determines how long the proxies or non-authoritative servers can cache the DNS record that has a Domain Name-IP binding for the domain name, along with other records. In a cloud deployment of the DNS protocol, a TTL may be about sixty seconds (60 s) or even less. For on-premises (e.g., private cloud or "Enterprise Closet") deployment of the DNS protocol, a TTL may be 3600 s (e.g., one hour), or more. In some embodiments, a client device may access two network resources: a first network resource serviced through a cloud DNS deployment, and a second network resource serviced through an Enterprise Closet DNS deployment. In such scenario, in a one hour lapse the DNS server may generate one resolution for the second network resource and sixty (60) resolutions for the second network service. Each time a new resolution is issued, the previous binding is rendered invalid in the OS cache of the client device, thus creating a cache bias 315. Cleanup tool 346 reduces noise 305 and cache bias 315, to eliminate unused and redundant IP addresses from baseline list 303, and including new IP addresses within a few iterations in baseline list 303. In some embodiments, to remove cache bias 315, normalizer tool 347 may perform a TF-IDF operation to multiply the number of resolutions with the TTL configured. Thus, a system consistent with embodiments disclosed herein may substantially reduce the occurrence of false alerts associated with IP addresses in noise 305. In some embodiments, normalizer tool 347 provides a dashboard alert to a network manager and to the DNS proxies linked to the new IP addresses when DNS domains are resolved to the new IP addresses to authorize configuration changes (e.g., adding to/dropping from the address to baseline list 303).

In some embodiments, cache bias 315 may be determined without prior network domain knowledge. A first scheme to determine cache bias may include initiating a direct query to the Name Server as indicated by the NS record for the domain. This will return the binding with the maximum configured TTL for the record (e.g., 60 s for a cloud configuration and 3600 s for a private closet configuration. However, a firewall in the enterprise block may direct DNS resolutions to external NS (e.g., some malwares may use this approach to spoof records). In this approach, queries to the proxy will return the remaining cached seconds in the record, hence masking the knowledge of the true Max TTL. For example, for a TTL of 25 s from a non-authoritative DNS, the Max TTL value could be 60 s, 3600 s or even 86400 s. In some embodiments, a second scheme to find the Max TTL value includes querying a start-of-authority (SOA) record, which contains timer information configuration (including refresh timer value that is a reflection of the Max TTL value). To avoid initiating SOA queries too often, so that the packet processor may be black listed to make further DNS queries, a cleanup step 346 may be performed prior to TTL fetch. In some embodiments, a strategy may include issuing SOA queries once for all domains 331 hosted by the same Name Server (as returned in NS record) to further reduce the risk of black listing. In some embodiments, the first or second schemes above described may be performed by an on-premises analysis engine (e.g., in access point 202, for an on-premises DNS deployment) or by the packet processor (e.g., packet processor 244 for a cloud DNS deployment).

Cleanup tool 346 may execute on packet processor 244, data analytics engine 200, network analysis engine 242-1, or any other suitable processing hardware. Cleanup tool 346 may include flagging suspicious activity, for example, any host (e.g., a DNS proxy or a client device) starting to reach external DNS servers directly after a period of using internal servers shows signs of infection. Also, the absence of DNS resolutions from a client device indicates the client device is likely configured with a web-proxy using a proxy auto-config (PAC) file. In some embodiments, cleanup tool 346 involves capturing timing information from a TimeZone (TZ)-DHCP server configured to deliver time zone of an access request. In some embodiments, timing information may be retrieved from the client devices (e.g., smart phones and the like). TZ-DHCP information can be used to infer normal working hours within a subnet, and compare it with a timestamp in the DPI metadata. Accordingly, cleanup tool 346 may identify a time of access violation, and compare it against baseline information.

In some embodiments, the packet processor uses an auditing protocol as an alternative route to obtain TZ information. Further, some embodiments include the scenario of multiple remote deployments providing traffic over an RSPAN tunnel to a single packet processor.

In some embodiments, cleanup tool 346 may be configured for tracking changes in the network architecture. For example, cleanup tool 346 may detect and log Add/Remove events of server nodes for a domain. Accordingly, when IP addresses are added or deleted, cleanup tool 346 prepares a new list of available servers. Accordingly, a network analysis engine may direct traffic profiles of data packets to follow closely the new list of available servers. Furthermore, the DNS server may update configuration protocols in the new IP addresses and track their performance. Spurious links and domain names typically form a sizeable portion of the data analyzed by the packet processor. Most of the problematic links and domain names are the result of aggressive browser behavior for resolving addresses. These spurious domains drain network resources and may cause the packet processor (or the analytics node) to be black-listed and/or quarantined by the host server, firewall, or other means by a network administrator. In some embodiments, cleanup tool 346 may perform the functionality described herein using the described algorithmic approach without any additional information from external sources. Accordingly, embodiments as disclosed herein apply a filter to remove spurious links and domain names. When the trailing suffix and the subnetworks are removed, the domain name contains yet another suffix. The remaining part of the domain name continues to stand alone with yet another domain and suffix:

*.microsoft.com.akadns.net=>*.microsoftcom

First list 302 includes a set of domain names 332, which may include company hosted servers, services in the cloud, or shadow IT domains. In some embodiments, domain names 332 may include enterprise servers providing valuable services, so that list 302 is usable in quite a few products to improve user experience. In some embodiments, IP addresses for domain names 332 are also timestamped for their active duration based on when they were first seen or deleted to produce the list 302, given a time reference.

Normalizer tool 347 identifies signature words from a document, and increases the relative scores of the signature words compared to other frequent prepositions and adverbs. In some embodiments, normalizer tool 347 may perform tf-idf after cleanup 346 removes complex domains from the set of domain names 332. In some embodiments, normalizer tool 347 uses a "bag-of-words" approach that counts the frequency of the words in one document (term-frequency) and uses the term-frequency to normalize the word frequency (inverse document frequency) across various documents. For example, words like: "is," "are," and "was" have a naturally higher frequency in most documents; accordingly, their weight is lowered on all documents, based on their frequency in a single document.

List 303 may include a server to IP list for use in security products/applications, such as behavioral profiles for server access. In such applications, a configuration to setup servers of interest may start from list 303. Network administrators may not be able to list all servers, even in a small network. Accordingly, list 303 may provide an accurate and updated list of servers available to configure, resulting in better user experience for server managers. The ordering of the servers in list 303 may be associated with a priority of the servers in list 303, thereby enabling servers to be selected from list 303 in an informed fashion.

Figure 4:
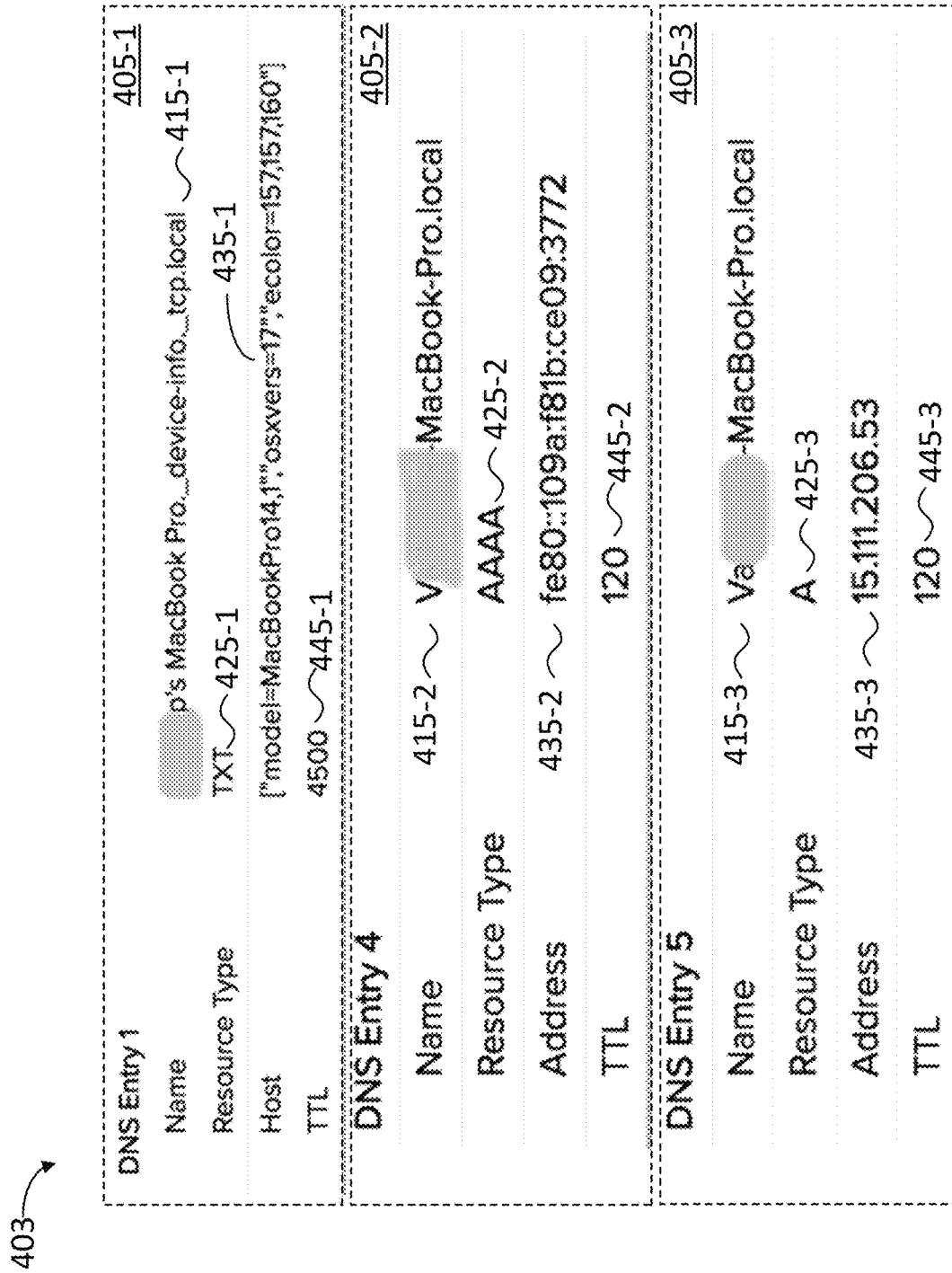
FIG. 4 illustrates a baseline list of servers in a network architecture, according to some embodiments.

FIG. 4 illustrates a baseline list 403 of servers in a network architecture, according to some embodiments. The network architecture for baseline list 403 may be part of an mDNS protocol. The network architecture may include a DNS server having a cleanup tool and a tf-idf tool configured to operate on traffic at the network edge (e.g., cleanup tool 246, tf-idf tool 247, data analytics engine 200, network edge 220, and network architecture 201). List 403 is organized in tuples 405-1, 405-2, and 405-3 (hereinafter, collectively referred to as "tuples 405"). Tuples 405 include DNS names 415-1, 415-2, and 415-3 (hereinafter, collectively referred to as "DNS names 415"), a resource type 425-1, 425-2, and 425-3 (hereinafter, collectively referred to as "resources 425"), its associated IP addresses 435-1, 435-2, and 435-3 (hereinafter, collectively referred to as "IP addresses 435") and DNS attributes 445-1, 445-2, and 445-3 (hereinafter, collectively referred to as "DNS attributes 445"). List 403 is sorted according to a hierarchy determined using the cleanup tool and the tf-idf tool in the DNS server. In some embodiments, the hierarchical order of list 403 indicates the importance of the server in the network. In some embodiments, the order of DNS names in list 403 is determined by finding maximum time to live (MAX TTL) values for each of the IP addresses associated with the DNS names (e.g., inspecting responses from the respective authoritative name servers—NS—as listed in NS records). The MAX TTL values are used in a normalization technique to sort the DNS names in list 403, as follows.

Figure 5:
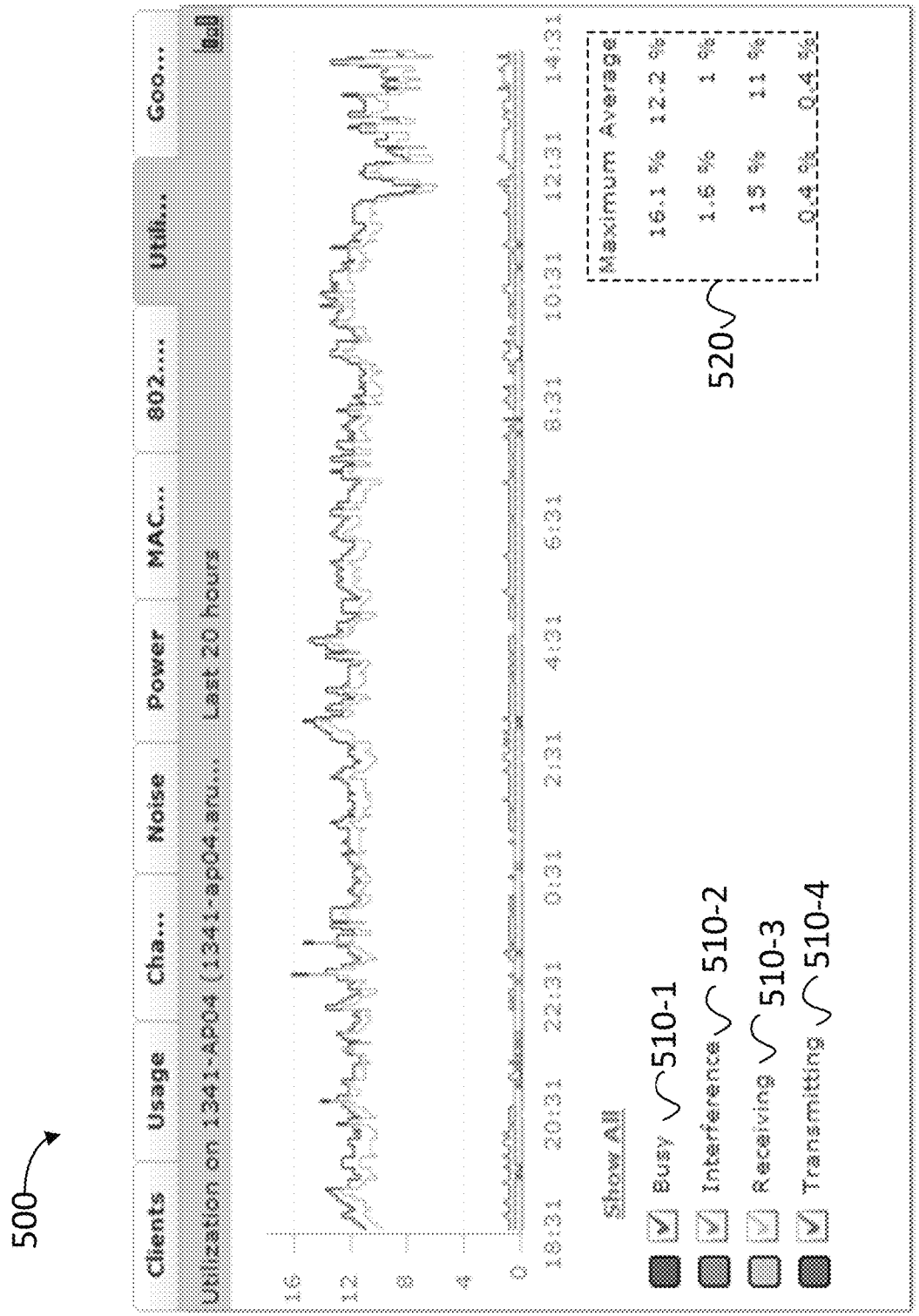
FIG. 5 illustrates a channel utilization information for a given channel in a DNS server from the architecture of FIG. 1, according to some embodiments.

FIG. 5 illustrates a channel utilization information 500 for a given channel in a DNS server from the architecture of FIGS. 1 and 2 (e.g., DNS server 100), according to some embodiments. The trends are plotted as a function of time, and include a busy curve 510-1, an interference curve 510-2, a receiving curve 510-3, and a transmitting curve 510-4. A field 520 may indicate relevant, aggregated features in each of curves 510 (e.g., 'Maximum' value and 'Average' value).

In some embodiments, a network edge includes wireless devices (e.g., client devices 110 being smartphones and the like), and channel utilization information 500 may be associated with Bluetooth based data collection techniques, as illustrated.

Figure 6:
FIG. 6 illustrates a client statistics as determined by a packet processor and provided to a DNS server, according to some embodiments.

FIG. 6 illustrates a client statistics dashboard 600 as determined by a packet processor and provided to a data processing engine (e.g., packet processors 144 and 244, and DNS servers 100), according to some embodiments. In some embodiments, a data collection server in or out of the packet processor (but communicatively coupled with it) may extract deep packet information including a summary chart 610 may indicate for multiple IP addresses 602 the percent bandwidth usage for network traffic. A signal-to-noise ratio (SNR) chart 620 may indicate how many access points or client devices operate at a given SNR value (e.g., in decibels, dB). A speed chart 630 may indicate the data rate of the traffic flowing through any one of the DNS servers or client devices (e.g., in megabits per second, Mbps). A chart 640 may indicate other features of the data traffic through any one of DNS servers or client devices (e.g., useful information throughput, and the like).

Figure 7A:
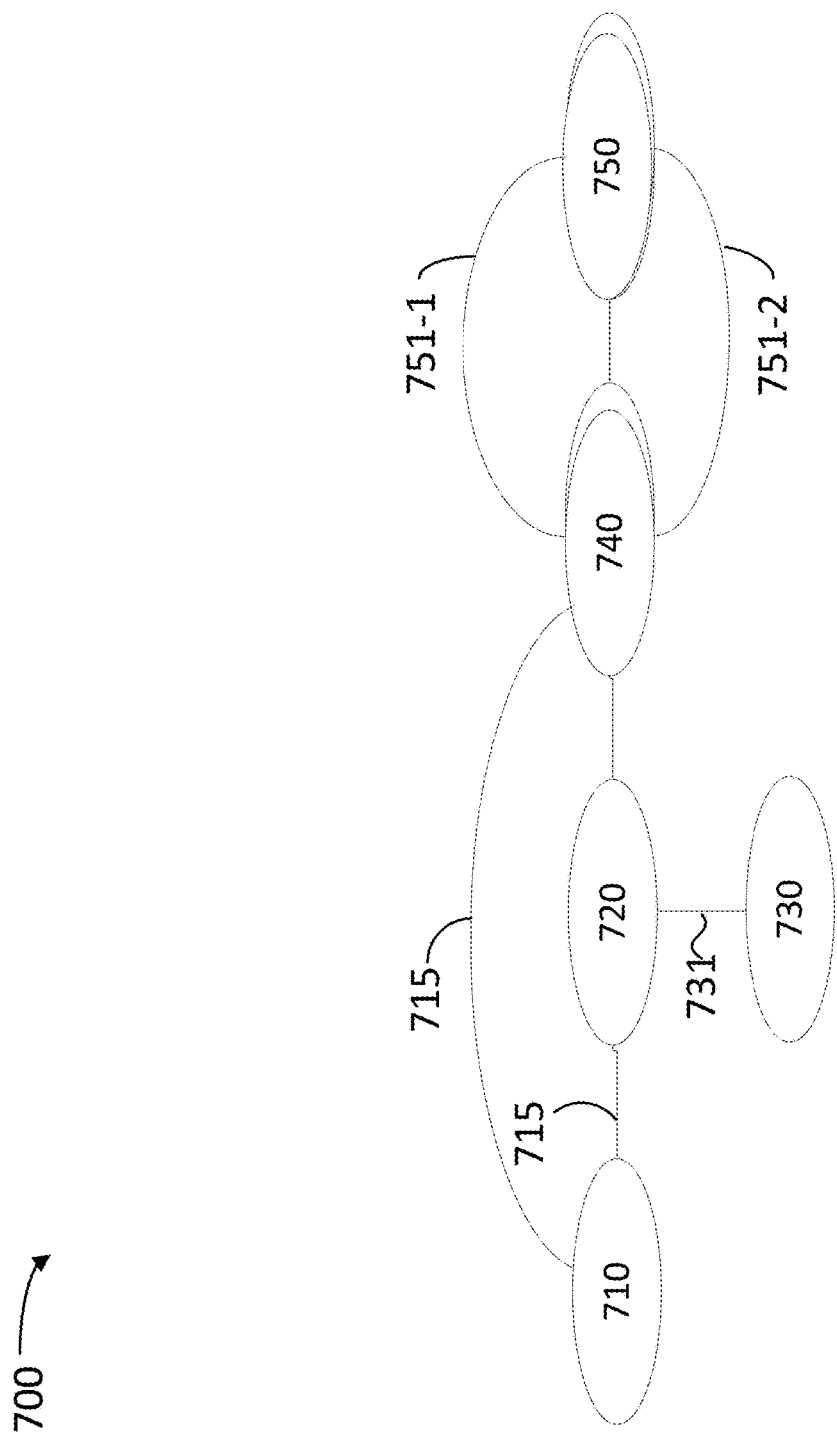
FIG. 7A illustrates a block diagram for mapping a domain name to a network address using a domain name service (DNS) protocol, according to some embodiments.
Figure 7B:
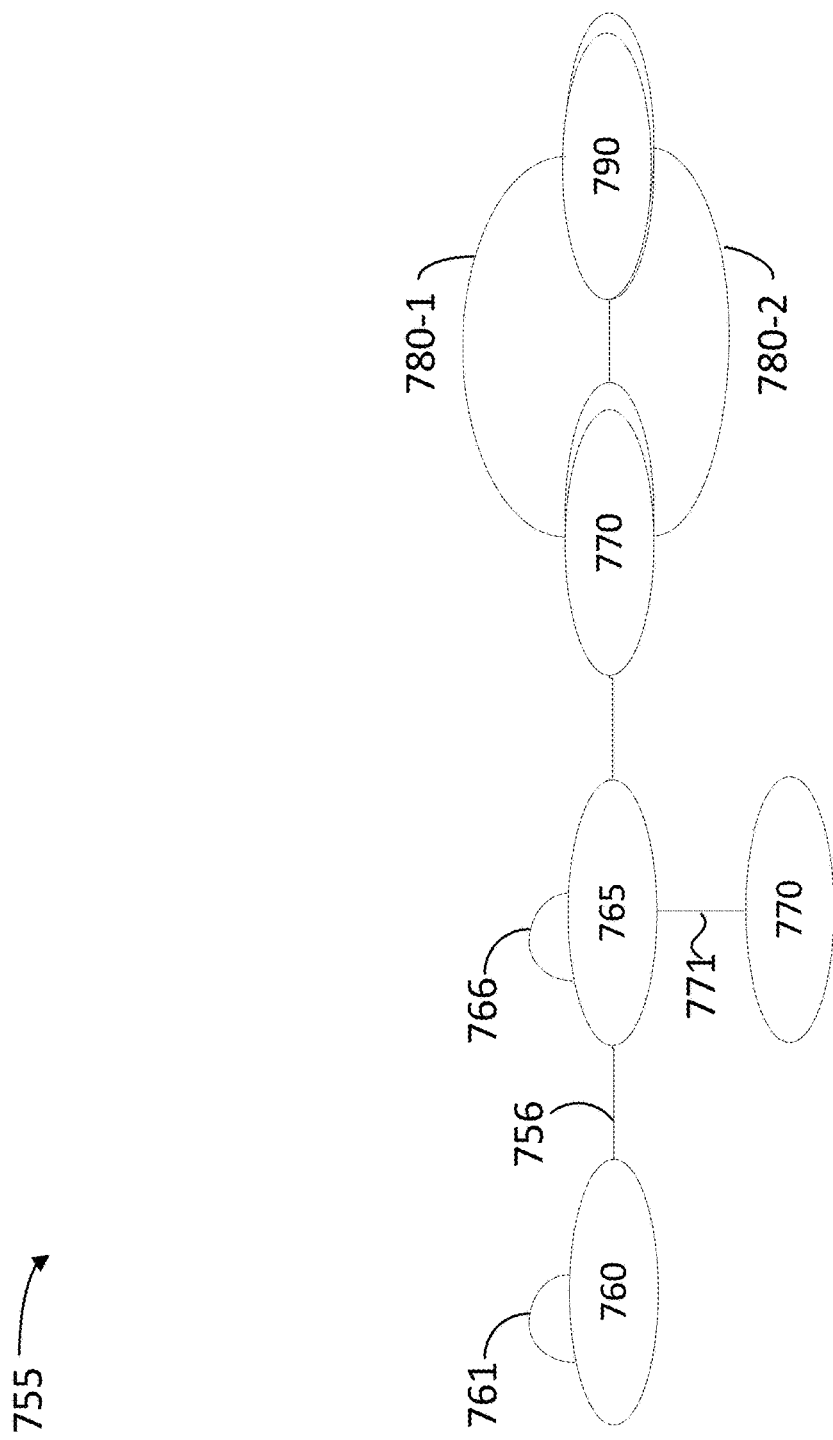
FIG. 7B illustrates a block diagram for mapping a domain name to a network address using a multicast domain name service (mDNS) protocol, according to some embodiments.

FIG. 7A illustrates a block diagram for a mapping 700 of a domain name 710 to an IP address 750 using a domain name service protocol, according to some embodiments. Mapping 700 may be performed by a mapping tool in a data processing engine close to a tap point and a packet processor in a network architecture as disclosed herein (e.g., mapping tool 249, data analytics engine 200, tap point 260, and packet processor 244). In embodiments consistent with the present disclosure, mapping 700 may be incorporated in a DNS protocol, as shown in FIG. 7A or a mutlticast DNS (mDNS) protocol, as shown in FIG. 7B.

Canonical name (CNAME) record 715 may be used to transfer domain name 710 to service instance 720 or node 740. A text pointer 731 associates a text record 730 with the attributes of the domain name. The request for IP address 750 from node 740 may use two types of requests, 751-1 and 751-2 (hereinafter, collectively referred to as "requests 751"), or may follow an indirect request through a CNAME record 715. A request 751-1 may include an internet protocol version 4 (IPv4) address record and a request 751-2 may include an internet protocol version 6(IPv6) record leading to IP address 750 (e.g., 15.111.189.169 through IPv4, or fe80::92ac:3fff:fe09:735b through IPv6).

In some embodiments, mapping 700 may include an authoritative server record (NS) that can be further queried to fetch a canonical name (CNAME) or an A/AAAA record. An unresolved request 751 is a request for A/AAAA with response as "Error." Another example of an unresolved request 751 may be a "Success" response wherein text record 730 does not resolve the query directly or indirectly to an A/AAAA record. For example, an unresolved request 751 may be a CNAME record without the A/AAAA record for the CNAME or the NS record that hosts the domain in the query. Some embodiments may include exceptions that seem correct but link to sink-holed addresses. For example, it is desirable to avoid or correct for domains that resolve to 127.0.0.1 or a default IP that functions as a walled-garden. In some instances, certain domains may seem successfully resolved, but do not link to a valid address, for example: *.akadns.net. Eg: *.microsoft.com.akadns.net, *edgesuite.net—Ex: *apple.com.edgesuite.net.

Data used in the existing detection technique for time-of-access violation uses the first and the last time of access from the time sorted list of flow records. Aggregate volume of the flow records is usually high. When a user (e.g., using a client device) accesses an IP address associated with a server, mapping 700 generates a record. Hence, resources required to perform a "map-reduce" or "Spark" job to reduce this data to the first and last time of access for each user and the group is higher, compared to leveraging DNS transactions.

A DNS transaction is indicative of intent to access the server, or a server access itself. In some aspects, at least one DNS resolution happens for each access by a user during a time period approximately equal to MAX-TTL, regardless of the number of flows (or conversations) initiated to any of the servers in the IP address list. The DNS transactions are timestamped, and have the real source IP initiating the access. This gives information about who is planning to access the server and when. In some embodiments, a DNS transaction with mapping 700 includes a DNS name, and occurs within the TTL of that DNS response. Hence the data and the resource needed to provide the insight is much less, allowing for smaller form-factors and thus various product options. DNS flow transactions from the network edge provides real source identities, as they are the closest to the source. In some embodiments, DNS provides intent of access of the source to the destination resolved. This provides implicit "regularizaton" of a machine learning model, thus improving "variance" of the model.

In some embodiments, mapping 700 may include a historical baseline of the resources accessed by a user to create warnings for any new resource access. In some embodiments, mapping 700 may be part of a data driven configuration in a network analysis engine. A baseline model maintains the cardinal set of servers accessed and any deviation from this set would be an abnormality. Additional automated design elements, like a watch-list of servers that may be controlled or critical, can be used to filter the new resource access, thus making the abnormal access to be anomalies. These watch lists of servers can be picked from the previous example of sorted list of servers of importance to trim the resources monitored. In some use cases, the watch lists may be generated from the lower sections of a baseline list (e.g., baseline lists 303 and 403) that are relatively low in popularity due to the limited access to those servers in the network, which may be limited to highly authorized users and/or machines, for security.

A historical baseline of all the users accessing a server resource forms a cardinal set of the users. Usage of the data for anomaly detection, except the watch list, now could come from contextual user-group information. New employees joining a group need not be flagged all the time. A false-positive workflow could mute all the first access of new employees based on some timeline to improve the fidelity of the anomalies flagged. User Group Information from data source like Active-Directory or HR database can also be used to build the cardinal set, and when a person from a group accesses resources beyond his/her perimeter, an anomaly can be flagged with the group user and the IP information.

FIG. 7B illustrates a block diagram for a mapping 755 of a domain name 760 to an IP address 790 using a multicast domain name service (mDNS) protocol, according to some embodiments. Mapping 755 may be performed by a mapping tool in a DNS server close to a tap point and a packet processor in a network architecture as disclosed herein (e.g., mapping tool 249, DNS data processing server 200, tap point 260, and packet processor 244). A record type 756 will be a record type call between domain name 760 and service instance 765.

Domain name 760 may be associated with a service type (e.g., "_service._dns-sd._udp.local"). A pointer record 761 transfers domain name 760 to a service instance 765 (e.g., "_airplay._tcp._local" or "Malibu._airplay.tcp_local"). A text pointer 771 associates a text record 770 with the attributes of the domain name (e.g., deviceid=a8:60:b6:12:ef:f5; features=0x4a7ffff7,0xe; flags=0xc; model=appletv5,3; pin=1; pk=271e7ccc629ee96a1eeeb2a12f7cc7203c1ea1dc5dd80d27c91c03127f762987;servers=220.68; vv=2). A service record 766 transfers service instance 765 to a node 770 (e.g., "Malibu-mm.local"). The request for IP address 790 from node 770 may use two types of requests, 780-1 and 780-2 (hereinafter, collectively referred to as "requests 780"), or may follow an indirect request through a CNAME. A request 780-1 may include an IPv4 address record and a request 780-2 may include an IPv6 address record leading to IP address 790 (e.g., 15.111.189.169 through IPv4, or fe80::92ac:3fff:fe09:735b through IPv6).

In some embodiments, mapping 755 may include an authoritative server record (NS) that can be further queried to fetch a canonical name (CNAME) or an A/AAAA record. An unresolved request 780 is a request for A/AAAA with response as "Error." Another example of an unresolved request 780 may be a "Success" response wherein pointer record 761, service record 766, and text record 770 do not resolve the query directly or indirectly to an A/AAAA record. For example, an unresolved request 780 may be a CNAME record without the A/AAAA record for the CNAME or the NS record that hosts the domain in the query. Some embodiments may include exceptions that seem correct but link to sink-holed addresses. For example, it is desirable to avoid or correct for domains that resolve to 127.0.0.1 or a default IP that functions as a walled-garden. In some instances, certain domains may seem successfully resolved, but do not link to a valid address, for example: *.akadns.net. Eg: *.microsoft.com.akadns.net, *edgesuite.net—Ex: *apple.com.edgesuite.net.

Data used in the existing detection technique for time-of-access violation uses the first and the last time of access from the time sorted list of flow records. Aggregate volume of the flow records is usually high. When a user (e.g., using a client device) accesses an IP address associated with a server, mapping 755 generates a record. Hence, resources required to perform a "map-reduce" or "Spark" job to reduce this data to the first and last time of access for each user and the group is higher, compared to leveraging DNS transactions.

A DNS transaction is indicative of intent to access the server, or a server access itself. In some aspects, at least one DNS resolution happens for each access by a user during a time period approximately equal to MAX-TTL, regardless of the number of flows (or conversations) initiated to any of the servers in the IP address list. The DNS transactions are timestamped, and have the real source IP initiating the access. This gives information about who is planning to access the server and when. In some embodiments, a DNS transaction with mapping 755 includes a DNS name, and occurs within the TTL of that DNS response. Hence the data and the resource needed to provide the insight is much less, allowing for smaller form-factors and thus various product options. DNS flow transactions from the network edge provides real source identities, as they are the closest to the source. In some embodiments, DNS provides intent of access of the source to the destination resolved. This provides implicit "regularizaton" of a machine learning model, thus improving "variance" of the model.

In some embodiments, mapping 755 may include a historical baseline of the resources accessed by a user to create warnings for any new resource access. In some embodiments, mapping 755 may be part of a data driven configuration in a network analysis engine. A baseline model maintains the cardinal set of servers accessed and any deviation from this set would be an abnormality. Additional automated design elements, like a watch-list of servers that may be controlled or critical, can be used to filter the new resource access, thus making the abnormal access to be anomalies. These watch lists of servers can be picked from the previous example of sorted list of servers of importance to trim the resources monitored. In some use cases, the watch lists may be generated from the lower sections of a baseline list (e.g., baseline lists 303 and 403) that are relatively low in popularity due to the limited access to those servers in the network, which may be limited to highly authorized users and/or machines, for security.

A historical baseline of all the users accessing a server resource forms a cardinal set of the users. Usage of the data for anomaly detection, except the watch list, now could come from contextual user-group information. New employees joining a group need not be flagged all the time. A false-positive workflow could mute all the first access of new employees based on some timeline to improve the fidelity of the anomalies flagged. User Group Information from data source like Active-Directory or HR database can also be used to build the cardinal set, and when a person from a group accesses resources beyond his/her perimeter, an anomaly can be flagged with the group user and the IP information.

Figure 8:
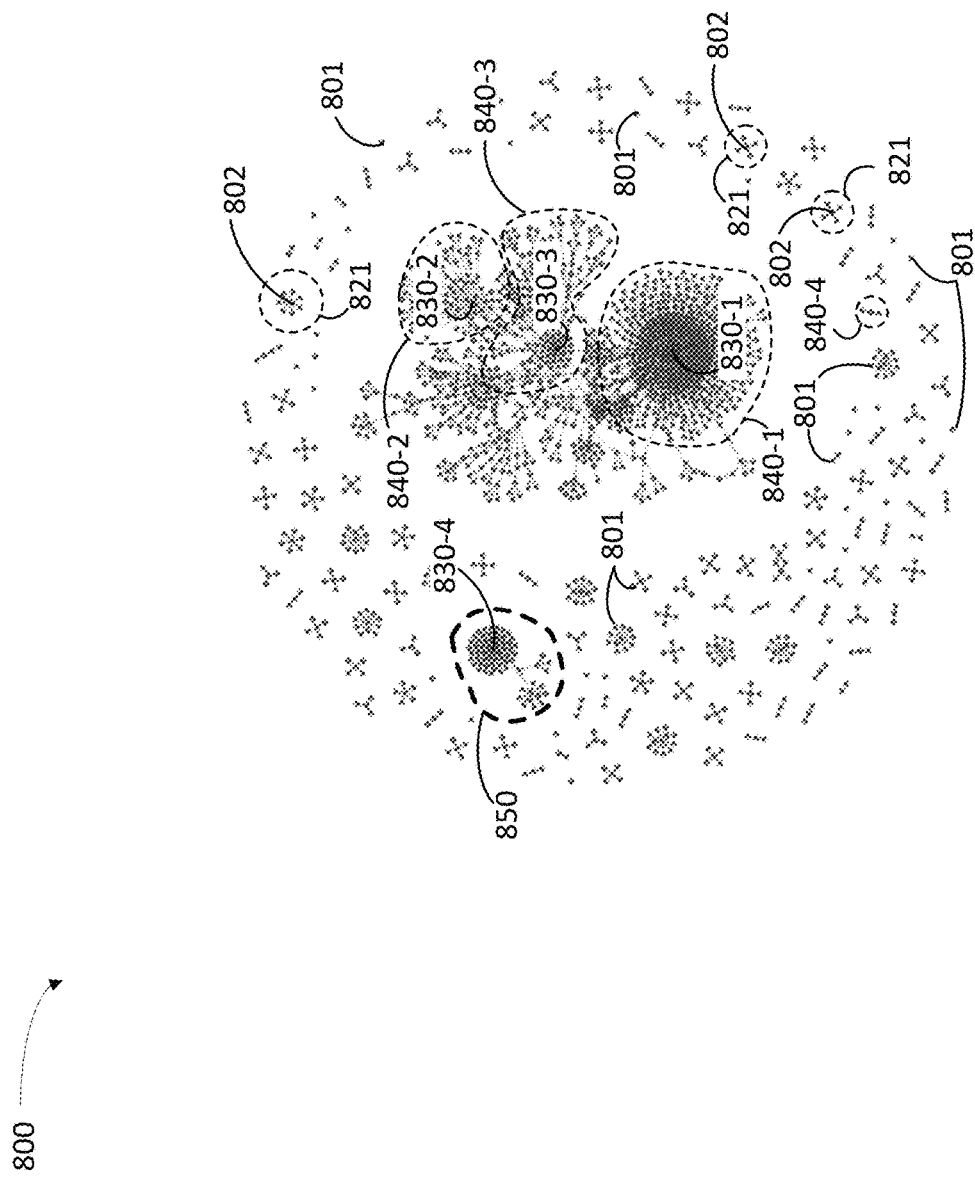
FIG. 8 illustrates a network graph for identifying relevant servers and traffic in a network, according to some embodiments.

FIG. 8 illustrates a network graph 800 for identifying relevant servers 830-1, 830-2, 830-3, and 830-4 (hereinafter, collectively referred to as "servers 830") and traffic in a network having devices that utilize the mDNS protocol for resolving host names and IP addresses, according to some embodiments. Network nodes 801 may include a client device, a router, an AP, a host server, a database, or any network device in a network architecture as disclosed herein (e.g., client devices 110 and 210, APs 102 and access point 202, routers 191 and 291, DNS server 100, data analytics engine 200, and host servers 130 and 230 in network architectures 101 and 201). In some embodiments, servers 830 may be sorted in a baseline list according to a popularity measure based on the connectivity of the server in network graph 800 (e.g., baseline lists 303 and 403). Thus, according to network graph 800, server 830-1 may be listed before servers 830, because of the higher density of network nodes 801 clustered around and coupled with server 830-1, as compared to servers 830-2, 830-3, and 830-4, in that order. Network graph 800 corresponds to one of multiple configurations in deployment topologies for a network architecture as disclosed herein. For example, in a deployment scenario with multiple LANs 821 serviced by BoCs 802, one of BoCs 802 may issue a request to acquire visibility and access basic behavioral profile.

In some embodiments, graph 800 may include a map of social clustering into enterprise groups 840-1, 840-2, 840-3 and 840-4 (hereinafter, collectively referred to as "enterprise groups 840"). Enterprise groups 840 include groups of employees that belong to a certain division of the enterprise. For example, group 840-1 may include programmers, group 840-2 may include hardware engineers and field technicians, and group 840-3 may include executives and management. It is expected that employees with common roles access a similar set of host servers 830. Clustering models as illustrated in graph 800 help visualize enterprise groups 840 based on common servers 830 and their sequence of access. This information can further be incorporated as a baseline configuration to monitor changes in groups 840. In some embodiments, graph 800 may graphically highlight a deviation 850 from the baseline behavior for visibility (e.g., a sudden clustering of client devices around a server 830-4). Some embodiments flag deviation 850 as a violation based on user-preference, in a user dashboard (wherein the user is a network administrator).

In some embodiments, graph 800 may be an example of when elements in FIG. 7B (e.g., domain name 760, pointer record 761, text record 770, from devices of a computer network are drawn as a graph. Substantial overlaps of domain name 760 and pointer record 761 may occur in graph 800 because they are service names. Devices that advertise services may be associated with elements (e.g., text record 770 and IP address 790) in leaf nodes or $1^{st}$ degree nodes. Certain services that are generic such as DNS Service Discovery (DNS-SD) form dense clusters. An administrator can prune the root node of such clusters to result in sub-clusters of nodes that were connected to the root node. The root of the newly-formed sub-clusters may formerly be the first hop from the root node, and may be associated with various network services such as AirPlay, Chromecast, and the like. Suitable graph placement algorithms may be used to provide better visibility to such services.

Such pruning and sub-clustering may provide for improved cleanup operations, such as performed by cleanup tool 346. The leaves and root of sub-clusters may be formed into tuples, and the tuples may be grouped by leaves (e.g., the IP addresses or host names) to provide a list of services (e.g., associated with the root of the sub-clusters) advertised by a single node.

Further, certain malware may use advertisements of quirky but unique service names, and may use mDNS as an election technique as a DNS domain generation algorithm (DGA) to generate large number of domain names that can be used as rendezvous points with their command and control servers. In such cases, administrators of a computer network may use graph 800 as a way to determine the indicator of compromise of such malware service names. This may enable administrators to better catch such malware in a computer network and also to provide information regarding affected nodes in the computer network.

Figure 9:
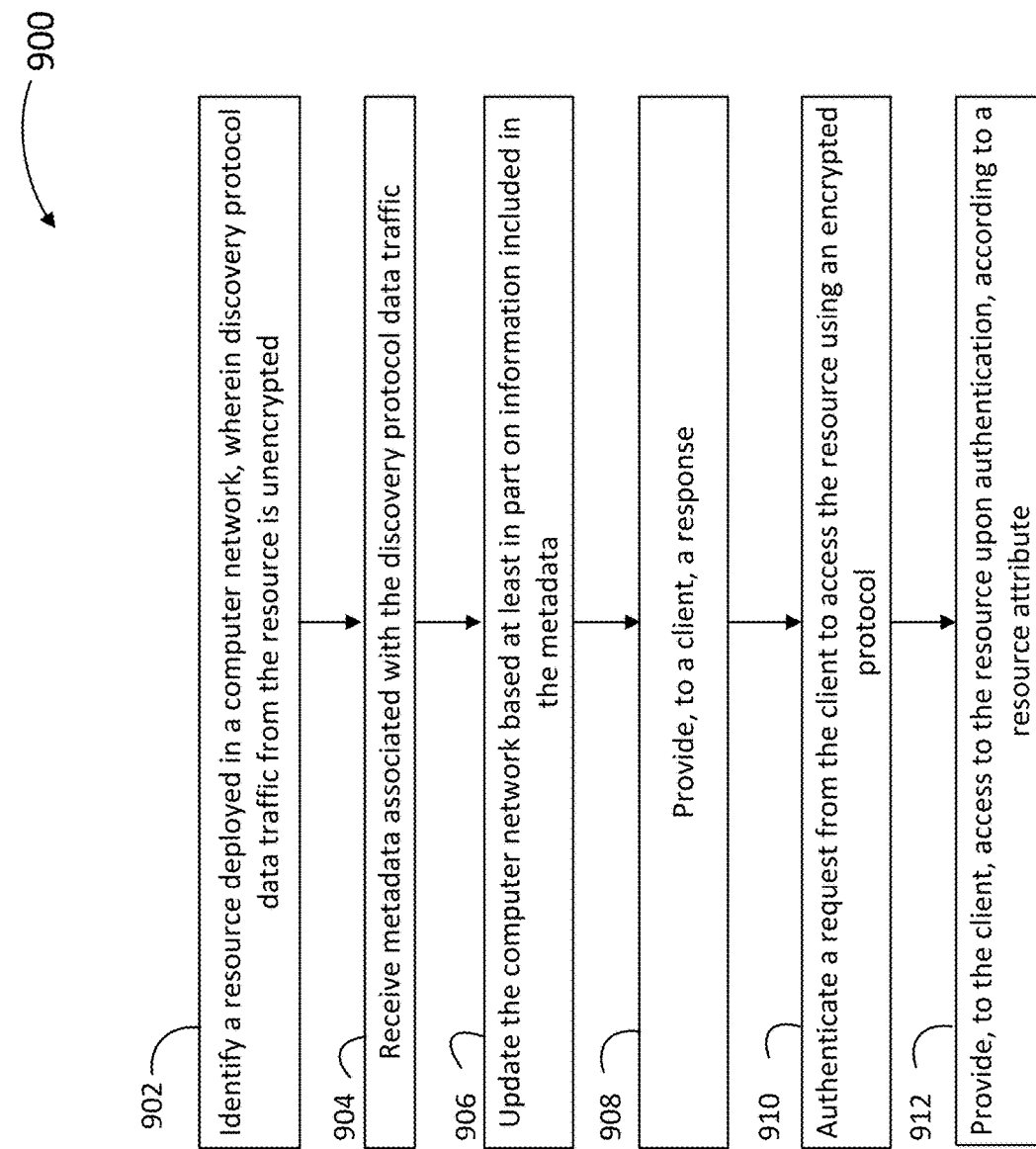
FIG. 9 is a flow chart illustrating steps in a method for leveraging discovery tools in a network analytics platform, according to some embodiments.

FIG. 9 is a flow chart illustrating steps in a method for using discovery protocols for analytics in a network analytics platform, according to some embodiments. Method 900 may be performed at least partially by any one of a server or a DNS server while communicating with a client device (e.g., any one of servers 130 and 230, DNS server 100, data analytics engine 200, and client devices 110 and 210). The server may be hosting a network analysis engine configured to perform at least a portion of an application installed in a client device (e.g., network analysis engine 242-1). The client device may be handled by a user, wherein the user may be a client of a network (e.g., network 150 or LANs 121). At least some of the steps in method 900 may be performed by a computer having a processor executing commands stored in a memory of the computer (e.g., processors 212, packet processors 144 and 244, and memories 232). Steps as disclosed in method 900 may include collecting network traffic data by a packet processor at a tap point in a network edge of a network architecture (e.g., packet processors 144 and 244, tap points 160 and 260, and network edge 120 and 220, and network architectures 101 and 201). Further, steps as disclosed in method 900 may include retrieving, editing, and/or storing files in a database that is part of, or is communicably coupled to, the computer, using, inter alia, the network analysis engine and other tools such as a discovery tool, a cleanup tool, a tf-idf tool, or a mapping tool (e.g., discovery tool 242-2, cleanup tool 246, tf-idf tool 247, and mapping tool 249). The database may include a configuration database (e.g., database 252). Methods consistent with the present disclosure may include at least some, but not all, of the steps illustrated in method 900, performed in a different sequence. Furthermore, methods consistent with the present disclosure may include at least two or more steps as in method 900 performed overlapping in time, or almost simultaneously.

Step 902 includes identifying a resource deployed in the computer network, where discovery protocol data traffic for the resource is unencrypted. In some embodiments, step 902 includes identifying whether the data traffic through the network resources involve a high-value and low-volume (e.g., discovery protocol data traffic from discovery tools), and whether the data traffic through the identified resources is authenticated but transmitted using unencrypted networking protocol. In some embodiments, step 902 includes identifying internal (e.g., closet) and external (e.g., cloud) servers in the network architecture. In some embodiments, step 902 also includes inferring information about the client device from the resources deployed in the network and the data traffic information. In some embodiments, step 902 includes determining that the resource is deployed in a network edge of the computing network when data traffic from the resource is unencrypted.

Step 904 includes receiving metadata associated with the discovery protocol data traffic. The metadata may include an indication of data associated with the resource. In some examples, the data associated with the resource may include a network address for the resource, a domain name for the resource, and the like. In some embodiments, receiving the metadata includes receiving subnetwork addresses and domains, including associate routers, valid MAC addresses and schedules, and device universal unique identifiers. In some embodiments, step 904 includes grouping IP addresses in the DNS list (e.g., DNS list 301), including IP addresses to network resources (e.g., access point 202 and client devices 210), into subnetworks to form a subnetwork mask to monitor a usage of the network addresses. Step 904 may further include counting the assigned IP addresses, and monitoring usage of the IP address pool. Further, in some embodiments, step 904 includes issuing warnings to the DNS server or the central server about DHCP pool exhaustion. In some embodiments, step 904 includes mapping the network address to the domain name when the network address is accessed by a valid request from a client device.

Step 906 includes updating the computer network based at least in part on the information included in the metadata. In some embodiments, step 906 may be a step that happens in the computer network and is observed by sensors to collect the information included in the metadata. Such updates may, in effect, be an information transfer from the client to the computer network or server, depending on the process being a democratic broadcast model (e.g., mDNS) or an arbitrated broadcast model (e.g., DNS or BitTorrent). For example, step 906 may include parsing network addresses in the computer network and updating a domain name service, such as a domain name service provided by DNS server 100, with the domain name for the resource. In some embodiments, step 906 includes parsing the subnetwork addresses and updating the domain name service. In some embodiments, step 906 includes identifying popular servers out of a plurality of servers using a configuration tracking and a tf-idf protocol, so that popular servers are identified based at least in part on a frequency of access to the plurality of servers. In some embodiments, step 906 includes augmenting the value of existing data sources and accessing profile resources in the subnetwork addresses to flag behavioral violations such as: anomalous server access, anomalous time of access, and social clustering in enterprise groups. In some embodiments, step 906 includes enforcing policy rules according to a smart configuration. Accordingly, in some embodiments, step 906 includes dropping a data packet for forwarding, and capturing the data packet for network visibility and security, based on a DPI at the packet processor. For example, in some embodiments, dropping the data packet may include applying an ACL drop rule and forwarding the data packet to a new domain name service. In some embodiments, step 906 includes identifying malware that attempts to leverage a lack of visibility to use service advertisement as election protocol to find a leader to do computer numerical control (CnC). Further, in some embodiments, step 906 includes specifying pre-network access translation (pre-NAT) or post-NAT traffic for packet inspection. In some embodiments, step 906 includes spreading the traffic load across various packet processors when a DNS resolution in the configuration of the packet processor is based on a geographical location of the network edge. In some embodiments, step 906 may include accessing the database to learn about a launch of a service/server. Accordingly, step 906 may include setting up IP address and DNS name bindings with refresh intervals in DNS servers having appropriate authorization levels. In some embodiments, step 906 includes setting up the CNAME link for at least some of the IP addresses in the database. For example, in some embodiments, step 906 includes setting up the CNAME link for IP addresses associated with an elastic load balancer (ELB). In some embodiments, step 906 includes updating the record from the ELB to the IP, when the IP is recycled. In some embodiments, step 906 includes setting bindings between new domain names and the network addresses with a pre-selected refresh interval. In some embodiments, step 906 includes recycling at least one of the network addresses with a new domain name.

Step 908 includes providing, to a client a response. In some embodiments, step 908 includes providing, to a client, the domain name for the resource and a service advertisement associated with the resource. In some embodiments, the response may be an open advertisement by the resource.

Step 910 includes authenticating a request from the client to access the resource using an encrypted protocol.

Step 912 includes providing, to the client, access to the resource upon authentication, according to a resource attribute. In some embodiments, step 912 includes updating a domain name service with the domain name for the resource and enforcing a policy rule of the computer network. In some embodiments, step 912 includes identifying popular servers in the computer network based on a frequency of access to multiple servers and updating the domain name service with the popular servers.

Figure 10:
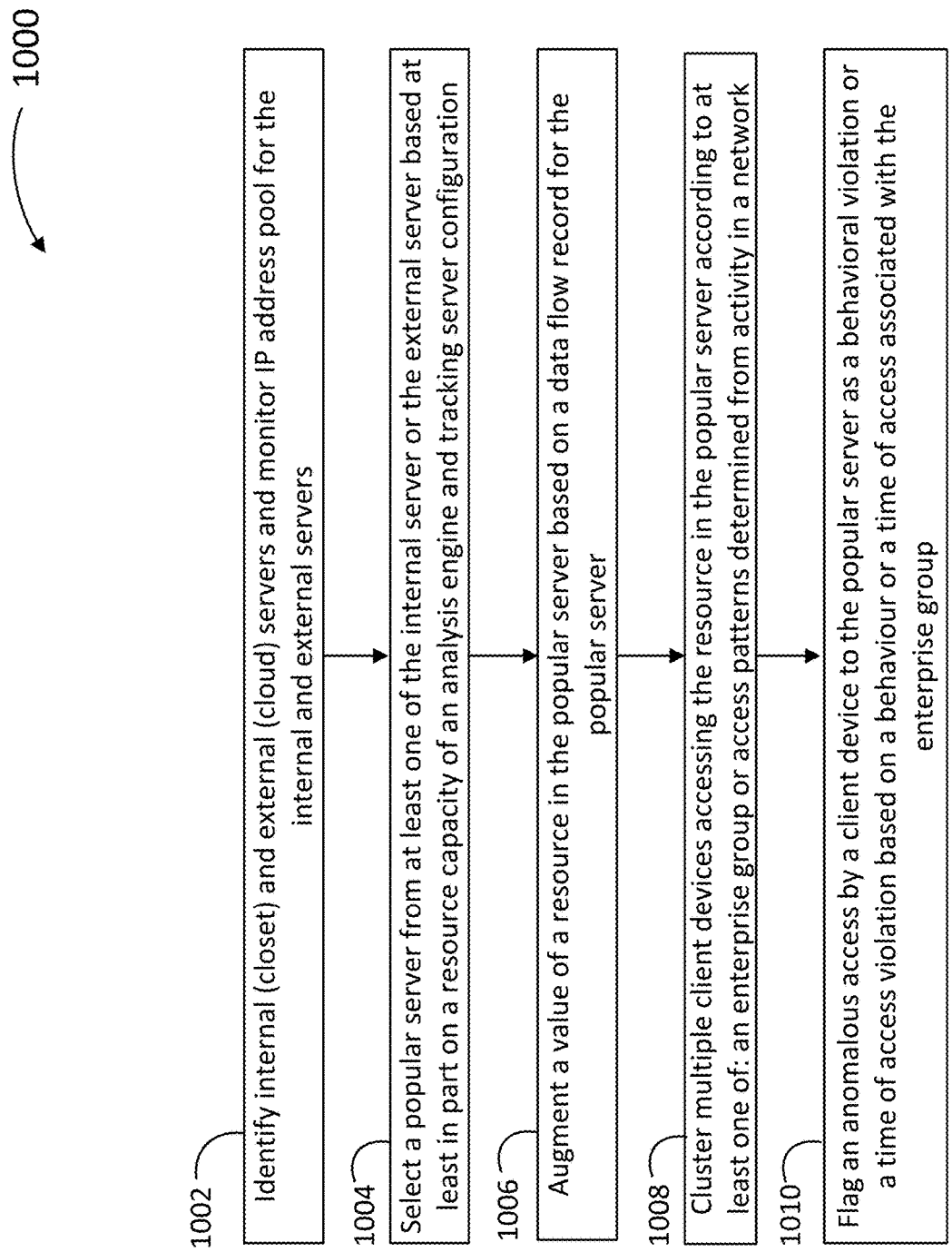
FIG. 10 is a flow chart illustrating steps in a method for using a network edge to determine network context and behavioral analysis, according to some embodiments.

FIG. 10 is a flow chart illustrating steps in a method for using a network edge to determine network context and behavioral analysis, according to some embodiments. Method 1000 may be performed at least partially by any one of a server while communicating with a client device (e.g., any one of servers 130 and 230, DNS servers 100 and 200, and client devices 110 and 210). The server may be hosting a network analysis engine configured to perform at least a portion of an application installed in a client device (e.g., network analysis engine 242-1). The client device may be handled by a user, wherein the user may be a client of a network (e.g., network 150 or LANs 121). At least some of the steps in method 1000 may be performed by a computer having a processor executing commands stored in a memory of the computer (e.g., processors 212, packet processors 144 and 244, and memories 232). Steps as disclosed in method 1000 may include network traffic data collected by a packet processor at a tap point in a network edge of a network architecture (e.g., packet processors 144 and 244, tap points 160 and 260, network edges 120 and 220, and network architectures 101 and 201). Further, steps as disclosed in method 900 may include retrieving, editing, and/or storing files in a database that is part of, or is communicably coupled to, the computer, using, inter alia, the network analysis engine and other tools such as a discovery tool, a cleanup tool, a tf-idf tool, or a mapping tool (e.g., discovery tool 242-2, cleanup tool 246, tf-idf tool 247, and mapping tool 249). The database may include a configuration database (e.g., database 252). Such configuration databases may include big databases such as HBase or analytical file-based databases such as Parquet and Optimized Row Columnar (ORC) files. Methods consistent with the present disclosure may include at least some, but not all, of the steps illustrated in method 1000, performed in a different sequence. Furthermore, methods consistent with the present disclosure may include at least two or more steps as in method 1000 performed overlapping in time, or almost simultaneously.

Step 1002 includes identifying internal (e.g., closet) and external (e.g., cloud) servers in a network, and monitoring the IP address pool for the internal and external servers. In some embodiments, step 1002 includes discovering servers and assets in the network. Accordingly, in some embodiments, step 1002 includes alerting a network administrator of a new server hosted in the network (e.g., a data driven network configuration strategy). In some embodiments, such as small IT groups, step 1002 enables leveraging the augmentation of new services and capabilities. In some embodiments, step 1002 includes placing a new server on a dashboard to alert a network administrator (user) of the DNS server, or any of the DNS proxies and/or client devices. In some embodiments, step 1002 also includes determining a behavioral profile for access to DNS servers in the network, or any other service in the network as determined by the base list of domain names that directly or indirectly maps to a service, with a security application running in the DNS server, in a DNS proxy, client device, or in a network firewall, and leveraging server discovery. To perform the behavioral profile, in some embodiments, step 1002 includes selecting the DNS servers according to hierarchy in a sorted baseline list (e.g., baseline list 303 and 403). In some embodiments, step 1002 includes requesting a moderator to avoid excessive bandwidth consumption in the network while discovering new servers and assets (e.g., when a network is particularly large and has an intricate topology). In some embodiments, step 1002 includes receiving a request for a new IP from a client device. Further, in some embodiments, step 1002 includes scanning a DNS log stored in the database or in a memory of a DNS server for the new IP address request and the response information. In some embodiments, step 1002 may include adapting to workflow variations for scalability, and to reduce fatigue and bandwidth consumption in large enterprises. Accordingly, step 1002 may include forming a suggestive dynamic watch list by filtering the baseline list according to several criteria. For example, step 1002 may include flagging new devices and servers in the network when they pass a pre-selected (or user configurable) popularity threshold. Step 1002 may also include selecting for the watch list servers according to a geographic domain, and partitioning a subnetwork in groups selected according to major subnetwork ranges based on a resolved IP address and different regions (e.g., Santa Clara, Bangalore, and the like) and/or different departments, such as .eng for engineering department, .finance for finance department, and the like. Hierarchical display of domains may extend to as many layers in domain names. In some embodiments, step 1002 includes placing a new server in the computer network on a dashboard to alert a network administrator. In some embodiments, step 1002 includes leveraging a server discovery according to a behavioral profile determined from a sorted baseline list of a domain name for the internal server or the external server. In some embodiments, step 1002 includes filtering a baseline list in a domain name service log stored in a database according to a geographic domain.

Step 1004 includes selecting a popular server from at least one of the internal server or the external server, and tracking server configuration for a better user experience, where the user is a network administrator. In some embodiments, the selection is based at least in part on a capacity of an analysis engine (e.g., data analytics engine 200). In some embodiments, step 1004 may include selecting popular servers by the density of connections to the server node in a network graph. In some embodiments, step 1004 includes accessing a log history in the database and selecting a domain name associated with a server having multiple access requests and responses. In some embodiments, step 1004 includes applying a neural network, a machine learning, or any type of nonlinear algorithm to parse the text in the log history for server requests and responses in the database.

Step 1006 includes augmenting the value of a resource in the popular server based on a data flow record for the popular server. In some embodiments, step 1006 includes augmenting the perceived value of the data flow record provided by a primary data source based on DNS information (e.g., as found in lists 301, 302, 303, and 403). When the destination hostname is not present in the flow records, step 1006 includes logically tying flow records to a service across multiple nodes with a DNS name to IP binding. In the absence of DNS information, step 1006 includes driving a server profile configuration through the IP address. In some embodiments, step 1006 includes logically tying flow records to a service across multiple nodes in the computer network using a binding for a domain name to a network address.

Step 1008 includes clustering multiple client devices accessing the resource in the popular server according to at least one of: an enterprise group or the activity in the network. In some embodiments, step 1008 includes clustering network devices based on social interactions within the enterprise groups.

Step 1010 includes flagging an anomalous access by a client device to the popular server as a behavioral violation or a time of access violation based on a behavior or a time of access associated with the enterprise group.

Figure 11:
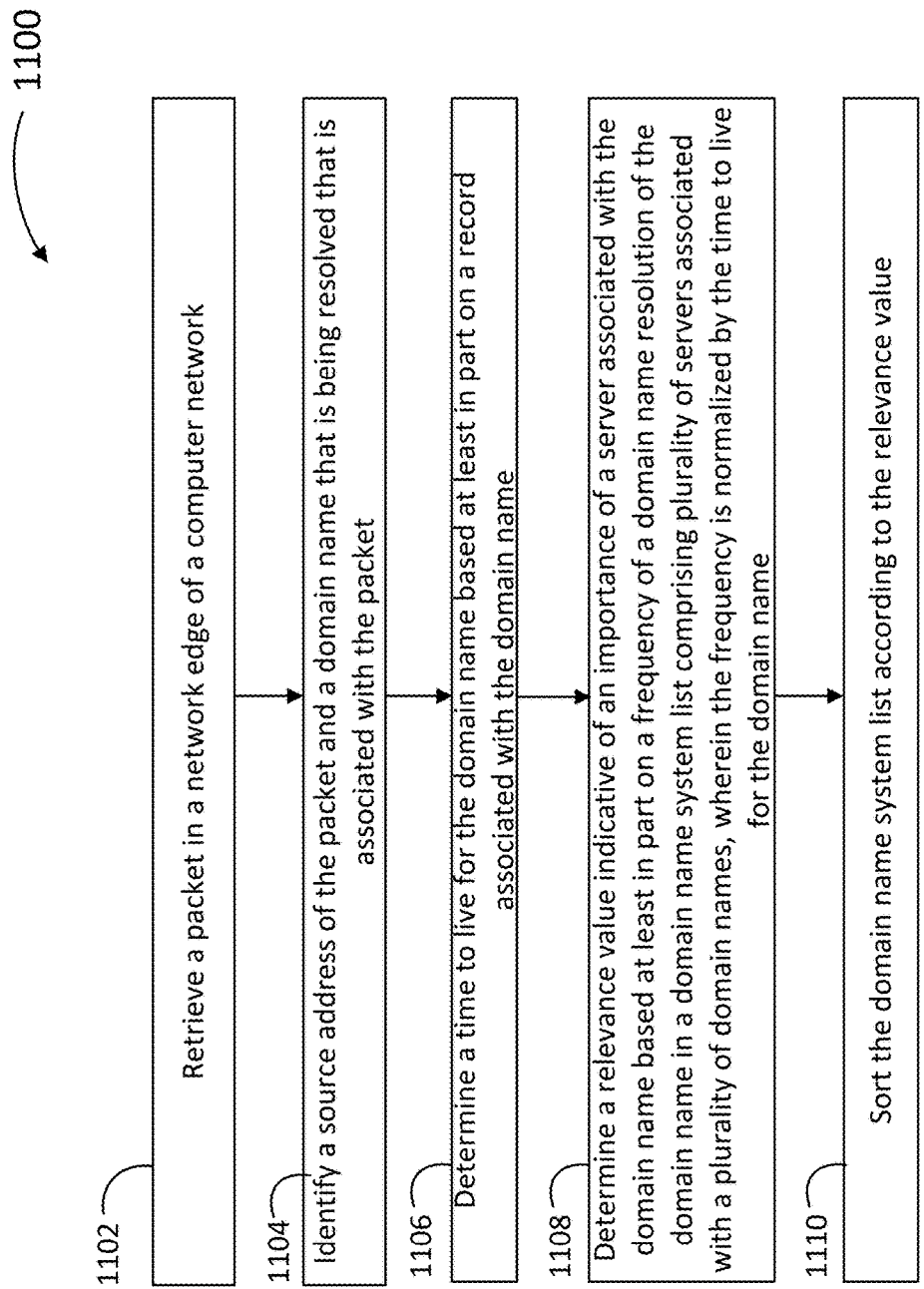
FIG. 11 is a flow chart illustrating steps in a method for using a dynamic host configuration protocol in a DNS to identify valuable assets in a network, according to some embodiments.

FIG. 11 is a flow chart illustrating steps in a method 1100 for using a dynamic host configuration protocol in a network to identify valuable assets of interest in an enterprise network, according to some embodiments. Method 1100 may be performed at least partially by any one of a server while communicating with a client device (e.g., any one of servers 130 and 230, data analytics engine 200, and client devices 110 and 210). The server may be hosting a network analysis engine configured to perform at least a portion of an application installed in a client device (e.g., network analysis engine 242-1). The client device may be handled by a user, wherein the user may be a client of a network (e.g., network 150 or LANs 121). At least some of the steps in method 1100 may be performed by a computer having a processor executing commands stored in a memory of the computer (e.g., processors 212, packet processors 144 and 244, and memories 232). Steps as disclosed in method 1100 may include network traffic data collected by a packet processor at a tap point in a network edge of a network architecture (e.g., packet processors 144 and 244, tap points 160 and 260, network edges 120 and 220, and network architectures 101 and 201). Further, steps as disclosed in method 1100 may include retrieving, editing, and/or storing files in a database that is part of, or is communicably coupled to, the computer, using, inter alia, the network analysis engine and other tools such as a discovery tool, a cleanup tool, a normalization tool, or a mapping tool (e.g., discovery tool 242-2, cleanup tool 246, tf-idf tool 247, and mapping tool 249). The database may include a configuration database (e.g., database 252). Methods consistent with the present disclosure may include at least some, but not all, of the steps illustrated in method 1100, performed in a different sequence. Furthermore, methods consistent with the present disclosure may include at least two or more steps as in method 1100 performed overlapping in time, or almost simultaneously.

Step 1102 includes retrieving a packet in a network edge of a computer network. In some embodiments, step 1102 includes retrieving a packet at a tap point located between an access point in a local area network and a domain name service server outside a firewall of a host in the computer network.

In some embodiments, step 1102 includes adding an entry in the domain name service list including a domain name, a network address associated with the domain name, and an attribute of the domain name in the domain name service list.

Step 1104 includes identifying a source IP address of the packet and/or a domain name being resolved, in a DNS list, wherein the DNS list includes multiple servers, each server associated with a domain name. In some embodiments, step 1104 may be applied to both source and destination addresses.

Step 1106 includes determining a TTL for a record holding the Domain Name to Address bindings for the domain name, based on a record associated with the domain name, such as an SOA record, which may be acquired by querying a configured name server. Determining the TTL for the record holding the Domain to Address bindings associated with the domain name may be referred throughout this disclosure as determining the TTL for the domain name. In some embodiments, step 1106 includes determining a maximum time to live (TTL) for the domain name based on a record of the source IP. In some embodiments, step 1106 includes determining the MAX TTL value as an inverse frequency access to the server associated with the domain name. In some embodiments, step 1106 includes querying an SOA record associated with the domain name for a plurality of configured timer values for DNS name to IP address bindings and selecting the last entry in the SOA record as the MAX TTL value. Sending a request to the SOA record avoids the access control of the network firewall, which typically only allows certain internal devices or other designated DNS servers to contact DNS servers outside the network. In some embodiments, step 1106 includes associating a domain name entry in the SOA record with a timer value indicative of how often the domain name entry is associated with a network address in a network transaction. In some embodiments, step 1106 may include configuring a DNS entry and associating the entry with a timer value indicative of how often the association between the DNS entry and an IP address is used. This scheme allows for caching results and reusing addresses for a period of time not to exceed the TTL value, to reduce network traffic. To ensure that the host has updated information, step 1106 may include assigning a low TTL value to a server configured to reconfigure at a high frequency, to query the server at a high rate. Likewise, step 1106 may include assigning a high TTL value to a server configured to change sporadically, so that the server is queried less often. In some embodiments, step 1106 includes determining a relatively small TTL value for content delivery networks (CDNs) and other Cloud hosted services, for security and operational reasons. Applications that tend to use one long session (high TTL) tend to go lower in the list than web-bound applications (e.g., applications that access/provide data within an internal domain). These servers are generally configured in the network with a longer MAX TTL precisely due to the type of applications. Accordingly, some embodiments use the MAX TTL value as a normalization factor. This data sheds visibility into the resources in the network and tells them what is important to the users, who are also their consumers. In some embodiments, step 1106 includes caching network traffic originated in the source address for at least the time to live for the packet.

Step 1108 includes determining a relevance value indicative of an importance of a server associated with the domain name. In some embodiments, the importance of the server may correspond to the importance of a predominant destination address of the domain name, as requested by multiple sources based on the popularity of the destination. In some embodiments, step 1108 includes determining a frequency of a domain name resolution of the domain name in the domain name service list, wherein the frequency is normalized by the TTL for the binding (e.g., for a shorter TTL a higher query frequency ensures the validity of the records before a traffic connection is initiated through the binding, cf. step 1106). In some embodiments, when a domain name is resolved through one or more canonical names (CNAME), step 1108 includes selecting the smallest TTL in the sequence for a frequency normalization factor (which is the inverse of the TTL). In some embodiments, step 1108 includes determining a single user resolution frequency and associate the relevance value to the single user resolution frequency (e.g., the higher the frequency of resolution for a given IP address, the higher the relevance of a server associated with that IP address). In some embodiments, step 1108 may include determining a normalization factor with the inverse of the single user resolution frequency, and normalizing the frequency of resolution of the servers across the network with respect to the single user resolution frequency using the normalization factor. Further, step 1108 may include determining the relevance value using the normalized frequency of resolution of the server. In some embodiments, determining the normalized frequency of resolution utilizes a td-idf algorithm (Term Frequency—Inverse Document Frequency: an algorithm used in document analysis for frequency of words and google search anchor or key word identification in a search string). The td-idf algorithm may use the logarithm of the inverse for normalization. To determine the relative priority of the servers, the TTL may be multiplied directly or the inverse of single user resolution frequency and resort to determine the relative order in the list.

In some embodiments, step 1108 may include adding an entry in the list, where the entry includes the domain name, the IP address associated with the domain name, and an attribute of the domain name.

Step 1110 includes sorting the domain name list according to the relevance value of each server having a domain name in the network. In some embodiments, step 1112 includes querying a server at the source address for a packet status at least once during a period of time equal to the time to live for the domain name.

Figure 12:
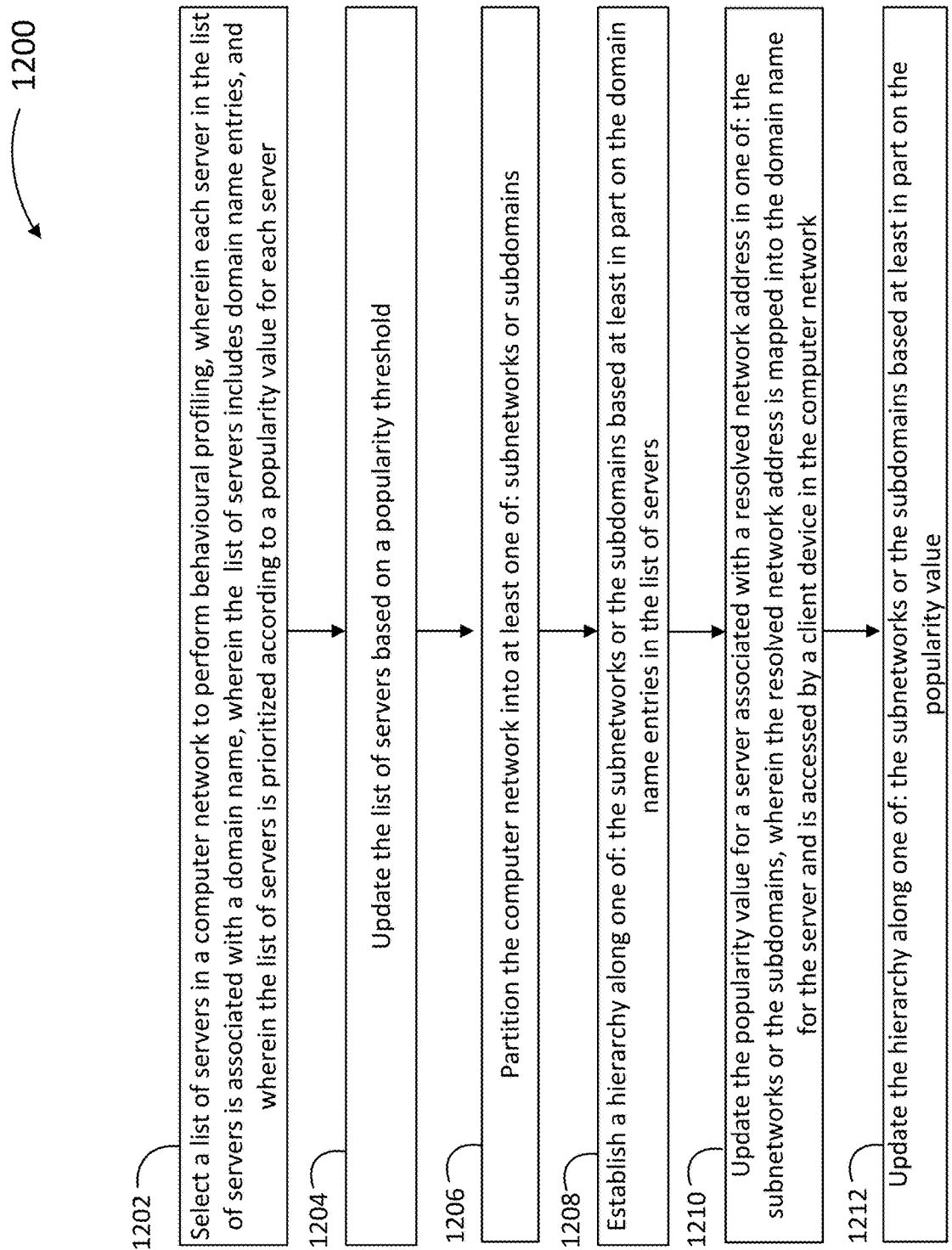
FIG. 12 is a flow chart illustrating steps in a method for monitoring a network configuration in a data driven workflow using a discovery tool, according to some embodiments.

FIG. 12 is a flow chart illustrating steps in a method 1200 for resource visualization of a network with data driven configuration for early customer engagement to build trust using the insight of popular servers in the network as value, according to some embodiments. In general, showing as much value with less user engagement to start with earns trust based on the information that is in part already known to the user. Further, showing such value changes the mode of engagement of a user as a recommendation system, instead of an anomaly detection when the user first gets to see the analytics results directly. This may change the expectation of the user in how the product is gauged by the user.

Method 1200 may be performed at least partially by any one of a server while communicating with a client device (e.g., any one of servers 130 and 230, data analytics engine 200, and client devices 110 and 210). The server may be hosting a network analysis engine configured to perform at least a portion of an application installed in a client device (e.g., network analysis engine 242-1). The client device may be handled by a user, wherein the user may be a client of a network (e.g., network 150 or LANs 121). At least some of the steps in method 1200 may be performed by a computer having a processor executing commands stored in a memory of the computer (e.g., processors 212, packet processors 144 and 244, and memories 232). Steps as disclosed in method 1200 may include collecting, by a packet processor, network traffic data at a tap point in a network edge of a network architecture (e.g., packet processors 144 and 244, tap points 160 and 260, network edges 120 and 220, and network architectures 101 and 201). Further, steps as disclosed in method 1200 may include retrieving, editing, and/or storing files in a database that is part of, or is communicably coupled to, the computer, using, inter alia, the network analysis engine and other tools such as a discovery tool, a cleanup tool, a tf-idf tool, or a mapping tool (e.g., discovery tool 242-2, cleanup tool 246, tf-idf tool 247, and mapping tool 249). The database may include a configuration database (e.g., database 252). Methods consistent with the present disclosure may include at least some, but not all, of the steps illustrated in method 1200, performed in a different sequence. Furthermore, methods consistent with the present disclosure may include at least two or more steps as in method 1200 performed overlapping in time, or almost simultaneously.

Step 1202 includes selecting a list of servers in a computer network to perform a behavioral profiling, wherein each server from the list of servers is associated with a domain name, wherein the list includes domain name entries, and wherein the list of servers is prioritized according to a popularity value for each server. In some embodiments, step 1202 includes determining the popularity value for each server from the list of servers and comprises determining a connectivity for each server from the list of servers in a network graph, and/or connectivity of the service advertisement from the list of servers in the network graph. In some embodiments, step 1202 includes determining the popularity value for each server from the list of servers based on a frequency of appearance of a domain name for each server from the list of servers in a log of multiple transactions in the computer network.

Step 1204 includes updating the list of servers based at least in part on a popularity threshold (e.g., to provide a cost-effective and scalable solution). In some embodiments, step 1204 includes removing a domain name from the list of servers when the domain name is flagged for a safety compromise. In some embodiments, step 1204 includes removing a domain name from the list of servers when a request for accessing the domain name violates a timing protocol.

Step 1206 includes partitioning a network into at least one of: subnetworks or subdomains. In some examples, at least one subnetwork from the partitioned subnetworks or at least one subdomain from the partitioned subdomains may cover a specific geographic domain. In some embodiments, step 1206 includes partitioning the computer network into an internal network comprising internal servers, and an external network comprising external servers, wherein the internal network and the external network are separated by a firewall defined according to an internal network administrator, and/or based on subnets determined by the resolved IP address of the servers and/or services.

Step 1208 includes establishing a hierarchy along at least one of: the subnetworks or the subdomains based at least in part on DNS entries in the list of servers. In some embodiments, the hierarchy is based on domain e.g., "eng.auroranetworks.com," "finance.auroranetworks.com," or "legal.auroranetworks.com." For example, in some embodiments, step 1208 may include establishing the hierarchy based on a frequency of use or access of the server. Thus, step 1208 may include ranking a server associated with a low TTL (e.g., a host server in a public domain) in a higher tier compared to a server associated with a higher TTL (e.g., an internal server). For example, in some embodiments, step 1208 may include collecting the following DNS list 1201:

| | |
|---|---|
| "perforce.eng.auroranetworks.com" | (1201.1); |
| "bugs.eng.auroranetworks.com" | (1201.2); |
| "sheets.finance.auroranetworks.com" | (1201.3); and |
| "media.mktg.auroranetworks.com" | (1201.4). |

Accordingly, step 1208 includes reordering and sorting the domain names in list (1201) based on their resolved IPs and popularity to show a subset list 1203:

| | |
|---|---|
| com.auroranetworks - | (1203.1) |
| a. eng - bugs, perforce (sorted by popularity) | (1203.2) |
| b. finance - sheets, funds | (1203.3) |
| c. mktg - media, tech | (1203.4) |

Step 1210 includes updating the popularity value for a server associated with a resolved network address within one of: the subnetworks or subdomains, wherein the resolved network address is mapped into the domain name for the server and is accessed by a client device in the computer network. In some embodiments, step 1210 includes normalizing a behaviour of the server with a frequency of access to the server in the computer network. In some embodiments, step 1210 includes inspecting a plurality of packets at a network edge. In some examples, the network edge is outside of a firewall for a server host in the computer network. In other examples, the network edge may be inside of the firewall. In some embodiments, step 1210 includes updating the popularity value based on a frequency of the resolution of network address for the domain name associated with the server. In some embodiments, step 1210 may include updating domains and IP subnets.

Step 1212 includes updating the hierarchy along the subnetworks based on the popularity value. In embodiments as disclosed herein, step 1212 may be performed at the packet processor close to a tap point that is in the network edge. Accordingly, it is expected that any hierarchy sorting of DNS servers (e.g., based on popularity) be more accurate compared to other network nodes further upstream (e.g., past the firewall and into a host server). This is because upstream network nodes may not see domain names that are queried less often (e.g., having a large MAX TTL). Data or metadata from the DNS resolution that are retrieved closer to the network edge may likely to be more accurate than data or metadata from the DNS resolution that are retrieved between a hierarchy of DNS servers upstream.

Figure 13:
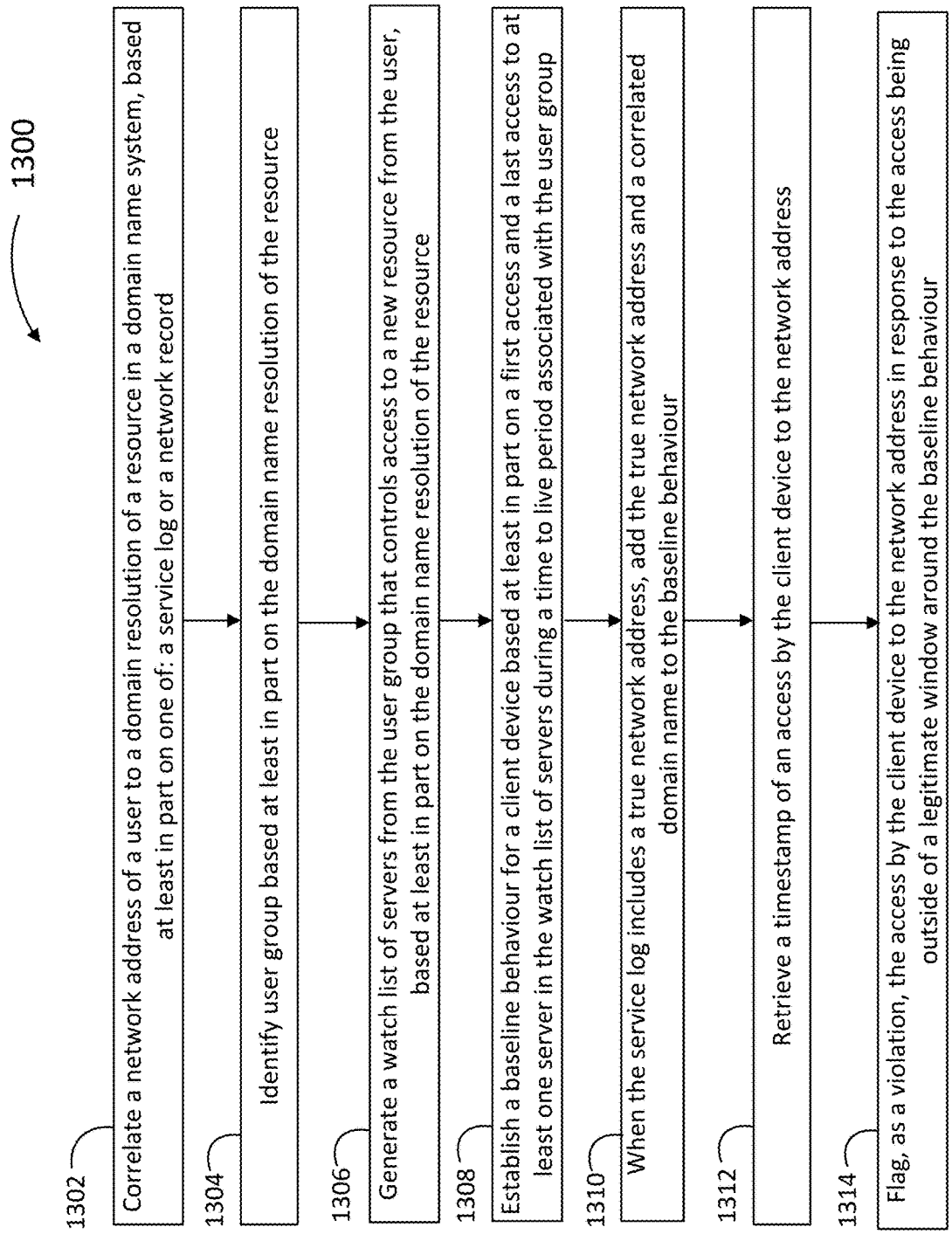
FIG. 13 is a flow chart illustrating steps in a method for behavioral profiling of a server access in a network, according to some embodiments.

FIG. 13 is a flow chart illustrating steps in a method 1300 for using discovery data for behavioral profiling of a server access in a network, according to some embodiments. Method 1300 may be performed at least partially by any one of a server while communicating with a client device (e.g., any one of servers 130 and 230, data analytics engine 200, and client devices 110 and 210). The server may be hosting a network analysis engine configured to perform at least a portion of an application installed in a client device (e.g., network analysis engine 242-1). The client device may be handled by a user, wherein the user may be a client of a network (e.g., network 150 or LANs 121). At least some of the steps in method 1300 may be performed by a computer having a processor executing commands stored in a memory of the computer (e.g., processors 212, packet processors 144 and 244, and memories 232). Steps as disclosed in method 1300 may include network traffic data collected by a packet processor at a tap point in a network edge of a network architecture (e.g., packet processors 144 and 244, tap points 160 and 260, network edges 120 and 220, and network architectures 101 and 201). Further, steps as disclosed in method 1300 may include retrieving, editing, and/or storing files in a database that is part of, or is communicably coupled to, the computer, using, inter alia, the network analysis engine and other tools such as a discovery tool, a cleanup tool, a tf-idf tool, or a mapping tool (e.g., discovery tool 242-2, cleanup tool 246, tf-idf tool 247, and mapping tool 249). The database may include a configuration database (e.g., database 252). Methods consistent with the present disclosure may include at least some, but not all, of the steps illustrated in method 1300, performed in a different sequence. Furthermore, methods consistent with the present disclosure may include at least two or more steps as in method 1300 performed overlapping in time, or almost simultaneously.

Step 1302 includes correlating a source IP address of a user to a user name in an active directory in a network to a domain resolution of a resource in a DNS system, based on one of: a service log (e.g., active directory service log) or a network record. In some embodiments, step 1302 includes identifying a user group based on the correlation and a lightweight directory access protocol (LDAP) information and/or a human resources database with username-based e-mail addresses. In some embodiments, step 1302 includes applying an extract transform and load pipelines to the service log to compare a sequence of text characters in the domain name to a sequence of digits in the network address. In some embodiments, step 1302 includes updating the user group based on a request-response packet captured by a packet processor at a tap point in the computer network.

Step 1304 includes identifying a user group based on a user correlation of the source IP, such as the domain resolution of the resource. In some embodiments, step 1304 may include adding the user group to the correlation between the source IP to the user name. This reduces variability in the correlation results, as different departments within the same enterprise may produce varying distributions of access, queries, and responses over the same set of servers. Thus, method 1300 adapts to the use of specific sectors within the same organization inferring additional group information.

Step 1306 includes generating a watch list of servers from the user group that controls access to a new resource from a first user, based on the domain resolution of the resource. In some embodiments, the first user is an administrator monitoring a server access. In some embodiments, step 1306 includes updating the watch list of servers by removing a domain name that is unresolved after a last access to at least one server in the computer network. In some embodiments, step 1306 includes filtering the watch list of servers to form a historical baseline of resources accessed by a second user. In some embodiments, the second user may be a client device accessing a network resource. In some embodiments, the first access and last access by a user may be used to formulate active operational hours of the user in a day, and can be extended to all users in the dataset. Another use case is the set of users, or user-departments or any other active directory-correlated information accessing one resource/server, including any new user or user. This can be extended to the plurality being profiled in the enterprise dataset. The first user may not necessarily be an administrator.

Step 1308 includes establishing a baseline behavior for a client device based on a first access and a last access to at least one server in the watch list of servers during a TTL associated with the user group (e.g., as determined by a time-stamped flow record). When the records contain the real source IP, step 1308 may include selecting multiple source IPs (or correlated users and their groups) accessing a resource, as the baseline. Access by any new entity (a New IP, User or Group) is flagged to warn about accessing the server. In some embodiments, step 1308 includes generating a support vector machine (SVM) model, or a machine learning model to generate a baseline that learns a margin determined by the first access of a day and the last access of the day. Typically, time-stamped flow records from the packet processor or logs from the DNS server, DNS proxy, or a DNS relay are used to get the time for first access and last time of access. In some embodiments, step 1308 may include flagging as a violation any access outside the baseline window with a margin around the legitimate access window. The baseline window may be based on a maximum and a minimum behavior tolerance in the service log. In some embodiments, step 1308 includes identifying deviations from the baseline in a generic framework. Further, in some embodiments, step 1308 includes modeling the data and picking one of the single-dimension models that captures the intuition behind the use-case. In some embodiments, a precise last time of access may not be available, and step 1306 may include inferring the last time of access with the TTL in the last DNS resolution, or the MAX-TTL from the SOA record. Accordingly, in some embodiments, step 1308 may include selecting an upper bound for the last access. Further, step 1308 may include regularizing the baseline behavior for flagging access violations. When network flow records are available, step 1308 further includes checking against real network access and suppressing any flagged access violations. In some embodiments, step 1308 also includes regularizing the model using peer baseline.

Step 1310 includes, when the service log includes a true source IP address, adding the true source IP address and a correlated domain name to the baseline behavior. In some embodiments, step 1310 includes removing a domain that remain unresolved after the last access to the at least one server.

Step 1312 includes retrieving a timestamp of an access by the client device to the network address. In some embodiments, step 1312 includes inspecting the DNS transaction to identify an entity accessing a resource and a time of access. In some embodiments, step 1312 includes identifying a time of access deviation from a timestamp of a given DNS transaction to resolve the server by a user based on the baseline built for the specific user (e.g., deviation from historical baseline for the user), thus leveraging the same set of features in the existing infrastructure. In some embodiments, step 1312 includes identifying a time of access deviation from a timestamp of a network transaction to resolve the server by a user, based on a baseline for the user.

Step 1314 includes flagging, as a violation, the access by the client device to the network address when the access is outside of a legitimate window around the baseline behavior. In some embodiments, a violation may include a DNS transaction outside of a legitimate window around the baseline behavior.

Figure 14:
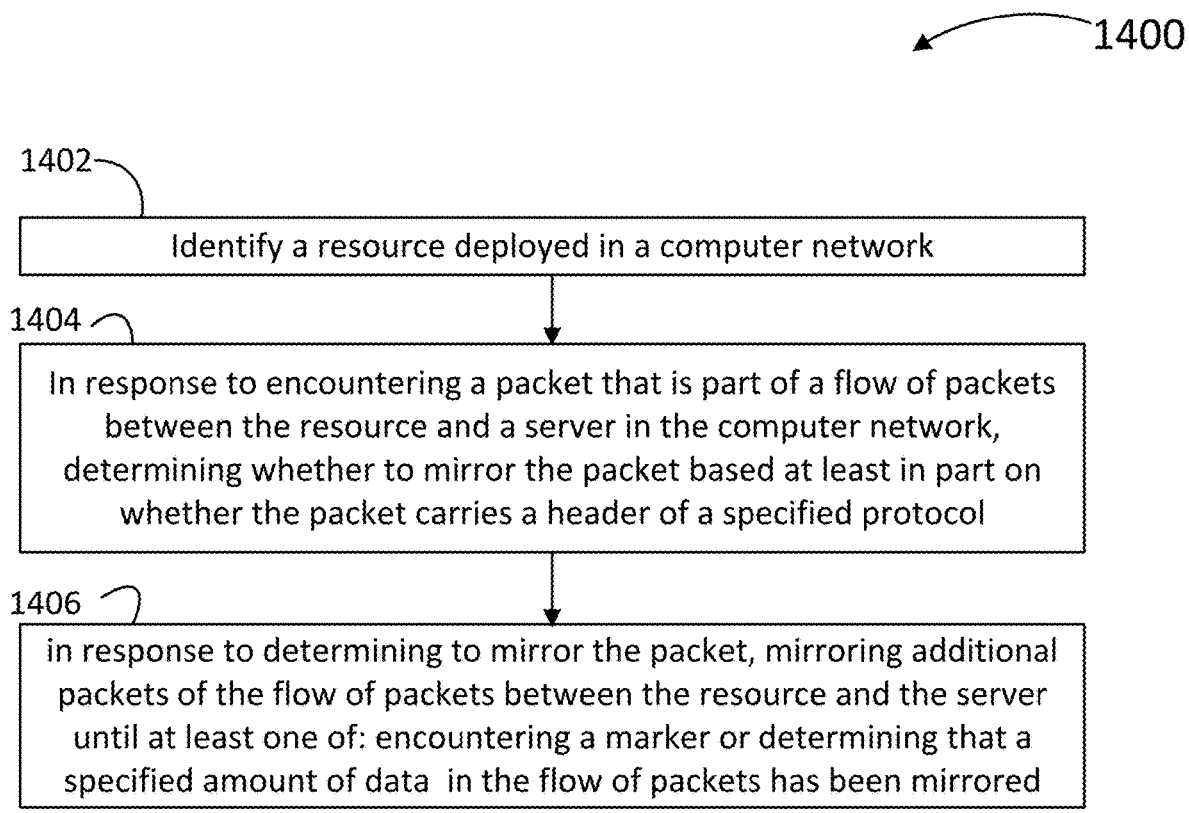
FIG. 14 is a flow chart illustrating steps in a method for selective and smart mirroring of low-volume and high-value data for analytics for seamless deployment, according to some embodiments.

FIG. 14 is a flow chart illustrating steps in a method 1400 for smart mirroring of low-volume high-value data for analytics for seamless deployment in a network, according to some embodiments. Method 1400 may be performed at least partially by any one of a server or a an analytics application while communicating with a client device (e.g., any one of servers 130 and 230, data analytics engine 200, and client devices 110 and 210). The server may be hosting a network analysis engine configured to perform at least a portion of an application installed in a client device (e.g., network analysis engine 242-1). The client device may be handled by a user, wherein the user may be a client of a network (e.g., network 150 or LANs 121). At least some of the steps in method 1200 may be performed by a computer having a processor executing commands stored in a memory of the computer (e.g., processors 212, packet processors 144 and 244, and memories 232). Steps as disclosed in method 1400 may include collecting, by a packet processor, network traffic data at a tap point in a network edge of a network architecture (e.g., packet processors 144 and 244, tap points 160 and 260, network edges 120 and 220, and network architectures 101 and 201) via remote SPAN using secure encapsulation, so that a single tunnel termination point can perform deep packet inspection and collect metadata from the mirrored packets. In some examples, servers that include a packet processor for performing smart mirroring may be network packet brokers. Further, steps as disclosed in method 1400 may include retrieving, editing, and/or storing files in a database that is part of, or is communicably coupled to, the computer, using, inter alia, the network analysis engine and other tools such as a discovery tool, a cleanup tool, a tf-idf tool, or a mapping tool (e.g., discovery tool 242-2, cleanup tool 246, tf-idf tool 247, and mapping tool 249). The database may include a configuration database (e.g., database 252). Methods consistent with the present disclosure may include at least some, but not all, of the steps illustrated in method 1400, performed in a different sequence. Furthermore, methods consistent with the present disclosure may include at least two or more steps as in method 1400 performed overlapping in time, or almost simultaneously.

Step 1402 includes identifying a resource deployed in a computer network. In some embodiments, step 1402 includes identifying whether the data traffic through the network resources involve high-value and high-volume data that nonetheless provides valuable insights to the computer network. An example of such high-value and high-volume data may be certain protocol headers. In some embodiments, step 1402 includes identifying internal (e.g., closet) and external (e.g., cloud) servers in the network architecture, such as via use of DHCP, as discussed throughout this disclosure. In some embodiments, step 1402 also includes inferring information about the client device from the resources deployed in the network and the data traffic information. In some embodiments, step 1402 includes determining that the resource is deployed in a network edge of the computing network when data traffic from the resource is unencrypted.

Step 1404 includes in response to encountering a packet that is part of a flow of packets between the resource and a server in the computer network, determining whether to mirror the packet. In some embodiments, step 1404 includes determining whether the packet carries a header of a specified protocol. In some embodiments, the specified protocol may include one or more of: HyperText Transport Protocol (HTTP), HyperText Transport Protocol Secure (HTTPS), Server Message Block (SMB), Simple Mail Transfer Protocol (SMTP), or Authentication with Certificate Exchange. In some embodiments, step 1404 includes determining whether to mirror the packet based at least in part on a destination port of the server that is specified by the packet. Certain destination ports may be mirrored by default, for example, for HTTP and HTTPS ports, such as ports 80, 8080, and 8888 for HTTP and ports 443, 8443, and 4343 for HTTPS.

In some embodiments, step 1406 includes in response to determining to mirror the packet, mirroring additional packets of the flow of packets between the resource and the server in the computer network, mirroring the additional packets until at least one of: encountering a marker or determining that a specified amount of data in the flow of packets has been mirrored. In some embodiments, the specified amount of data may be a specified number of bytes of the flow of packets. In some embodiments, the marker may be a handshake state between the resource and the server, such as the handshake state of a HTTPS to Secure Socket Layer (SSL) handshake. In some embodiments, the handshake state of may be the occurrence of a certificate exchange or a key exchange. In some embodiments, the marker may be a flow state of a deep packet inspection (DPI) library.

Hardware Overview

Figure 15:
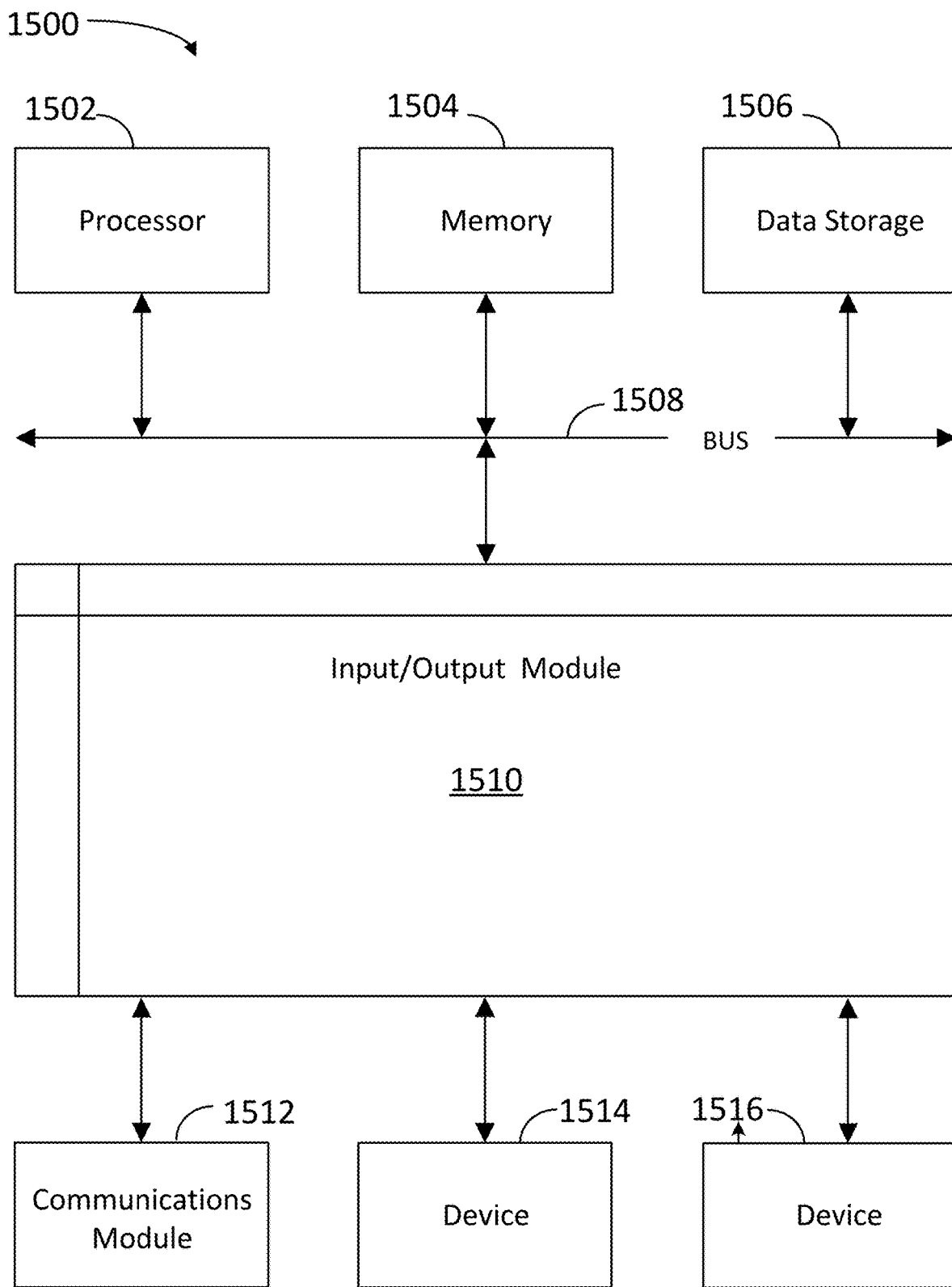
FIG. 15 is a block diagram illustrating an example computer system with which the architectures of FIGS. 1 and 2, and the methods of FIGS. 9-14 can be implemented.

FIG. 15 is a block diagram illustrating an example computer system with which the architectures of FIGS. 1 and 2, and the methods of FIGS. 9-14 can be implemented. In certain aspects, computer system 1500 may be implemented using hardware or a combination of software and hardware, either in server, integrated into another entity, or distributed across multiple entities. In some examples, computer system 1500 may be an example of one system in a cluster of systems (e.g., a Hadoop cluster) with which the architectures of FIGS. 1 and 2, and the methods of FIGS. 9-14 can be implemented.

Computer system 1500 (e.g., client device 110 and server 130) includes a bus 1508 or other communication mechanism for communicating information, and a processor 1502

(e.g., processors 212) coupled with bus 1508 for processing information. By way of example, the computer system 1500 may be implemented with one or more processors 1502. Processor 1502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1500 can include, in addition to hardware, code that creates an execution environment for the computer program in question, e.g., code that constitutes processor firmware, a protocol stack, a database management system, an operating system, or a combination of one or more of them stored in an included memory 1504 (e.g., memories 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1508 for storing information and instructions to be executed by processor 1502. The processor 1502 and the memory 1504 can be supplemented by, or incorporated in, special purpose logic circuitry.

The instructions may be stored in the memory 1504 and implemented in one or more computer program products, e.g., one or more modules of computer program instructions encoded on a computer readable medium for execution by, or to control the operation of, the computer system 1500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, metaparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, worth languages, and xml-based languages. Memory 1504 may also be used for storing temporary variable or other intermediate information during execution of instructions to be executed by processor 1502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1500 further includes a data storage 1506 such as a magnetic disk or optical disk, coupled to bus 1508 for storing information and instructions. Computer system 1500 may be coupled via input/output module 1510 to various devices. Input/output module 1510 can be any input/output module. Exemplary input/output modules 1510 include data ports such as USB ports. The input/output module 1510 is configured to connect to a communications module 1512. Exemplary communications modules 1512 (e.g., communications modules 208) include networking interface cards, such as Ethernet cards and modems. In certain aspects, input/output module 1510 is configured to connect to a plurality of devices, such as an input device 1514 (e.g., input device 214) and/or an output device 1516 (e.g., output device 216). Exemplary input devices 1514 include a keyboard and a pointing device, e.g., a mouse or a trackball, by which a user can provide input to the computer system 1500. Other kinds of input devices 1514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1516 include display devices, such as an LCD (liquid crystal display) monitor, for displaying information to the user.

According to one aspect of the present disclosure, the client device 110 and server 130 can be implemented using a computer system 1500 in response to processor 1502 executing one or more sequences of one or more instructions contained in memory 1504. Such instructions may be read into memory 1504 from another machine-readable medium, such as data storage 1506. Execution of the sequences of instructions contained in main memory 1504 causes processor 1502 to perform the process steps described herein. One or more processors in a multi-processing arrangement may also be employed to execute the sequences of instructions contained in memory 1504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data DNS server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1500 can include clients and DNS servers. A client and DNS server are generally remote from each other and typically interact through a communication network. The relationship of client and DNS server arises by virtue of computer programs running on the respective computers and having a client-DNS server relationship to each other. Computer system 1500 can be, for example, and without limitation, a desktop computer, laptop computer, or tablet computer. Computer system 1500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1502 for execution. Such a medium may take many forms, including, but not limited to, non-volatile media, volatile media, and transmission media. Non-volatile media include, for example, optical or magnetic disks, such as data storage 1506. Volatile media include dynamic memory, such as memory 1504. Transmission media include coaxial cables, copper wire, and fiber optics, including the wires forming bus 1508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
retrieving a packet in a network edge of a computer network;
identifying a source address of the packet and a domain name that is being resolved that is associated with the packet;
determining a time to live (TTL) for the domain name based at least in part on a record associated with the domain name, the record holding a domain name to address binding for the domain name;

determining a relevance value indicative of an importance of a server associated with the domain name based at least in part on a frequency of requests by multiple sources to resolve the domain name reflected in a domain name system list comprising a plurality of servers associated with a plurality of domain names, wherein the frequency is normalized by the TTL for the domain name to address binding by multiplying a number of domain name resolutions with an inverse of the value of the TTL; and sorting the domain name system list according to the relevance value.

2. The computer-implemented method of claim 1, wherein retrieving the packet in the network edge of the computer network comprises retrieving the packet at a tap point located between an access point in a local area network in the computer network and a domain name system server outside a firewall of a host in the computer network.

3. The computer-implemented method of claim 1, further comprising adding an entry in the domain name system list, wherein the entry includes the domain name, a network address associated with the domain name, and an attribute of the domain name.

4. The computer-implemented method of claim 1, wherein determining the TTL of the domain name comprises determining a maximum TTL from a plurality of record entries associated with the domain name.

5. The computer-implemented method of claim 1, wherein determining the TTL for the domain name comprises transmitting a request to a Start of Authority (SOA) record for a plurality of timer values of a domain name to network address binding associated with the domain name, and selecting a last entry in the SOA record as the TTL.

6. The computer-implemented method of claim 1, wherein determining the TTL for the domain name comprises associating a domain name entry in a SOA record with a timer value indicative of how often the domain name entry is associated with a network address in a network transaction.

7. The computer-implemented method of claim 1, wherein determining the TTL for the domain name comprises assigning a lower value of the TTL for the domain name if the packet originated from a content delivery network, compared to if the packet originated in a proxy server of a private cloud or enterprise network.

8. The computer-implemented method of claim 1, wherein determining the TTL for the domain name comprises selecting a shortest TTL value from a group consisting of one or more canonical names associated to the domain name for the source address.

9. The computer-implemented method of claim 1, further comprising caching network traffic originated in the source address for at least the TTL for the packet.

10. A system, comprising:
a memory storing instructions; and
one or more processors configured to execute the instructions to cause the system to:
retrieve a packet in a network edge of a computer network;
identify a source address of the packet and a domain name that is being resolved that is associated with the packet;
determine a time to live (TTL) for the domain name, based at least in part on a record associated with the domain name, the record holding a domain name to address binding for the domain name;
determine a relevance value indicative of an importance of a server associated with the source address based at least in part on a frequency of requests by multiple sources to resolve the domain name in a domain name system list associated with the packet, wherein the frequency is normalized by the TTL for the domain name to address binding by multiplying a number of domain name resolutions with an inverse of the value of the TTL; and
sort the domain name system list according to the relevance value.

11. The system of claim 10, wherein to retrieve the packet in a network edge of the computer network the one or more processors are configured to retrieve the packet at a tap point located between an access point in a local area network in the computer network and a domain name system server outside a firewall of a host in the computer network.

12. The system of claim 10, wherein the one or more processors are further configured to add an entry in the domain name system list, wherein the entry includes the domain name, a network address associated with the domain name, and an attribute of the domain name.

13. The system of claim 10, wherein to determine the TTL of the domain name the one or more processors are configured to determine a maximum TTL from a plurality of record entries associated with the domain name.

14. The system of claim 10, wherein to determine the TTL for the domain name the one or more processors are configured to transmit a request to a Start of Authority (SOA) record for a plurality of timer values of a domain name to network address binding associated with the domain name, and selecting a last entry in the SOA record as the TTL.

15. The system of claim 10, wherein to determine the TTL for the domain name, the one or more processors are configured to associate a domain name entry in a SOA record with a timer value indicative of how often the domain name entry is associated with a network address in a network transaction.

16. A non-transitory, computer readable medium storing instructions which, when executed by a processor, cause a computer to perform a method, the method comprising:
retrieving a packet in a network edge of a computer network;
identifying a source address of the packet and a domain name that is being resolved that is associated with the packet;
determining a time to live (TTL) for the domain name, based at least in part on a record associated with the domain name, the record holding a domain name to address binding for the domain name;
determining a relevance value indicative of an importance of a server associated with the source address based at least in part on a frequency of requests by multiple sources to resolve the domain name in a domain name system list comprising a plurality of servers associated with a plurality of domain names, wherein the frequency is normalized by the TTL for the domain name to address binding by multiplying a number of domain name resolutions with an inverse of the value of the TTL; and
sorting the domain name system list according to the relevance value.

17. The non-transitory, computer readable medium of claim 16, wherein retrieving the packet in the network edge of the computer network comprises retrieving the packet at a tap point located between an access point in a local area network in the computer network and a domain name system server outside a firewall of a host in the computer network.

18. The non-transitory, computer readable medium of claim 16, wherein the method further comprises adding an entry in the domain name system list, wherein the entry includes the domain name, a network address associated with the domain name, and an attribute of the domain name.

19. The non-transitory, computer readable medium of claim 16, wherein, in the method, determining the TTL of the domain name comprises determining a maximum TTL from a plurality of record entries associated with the domain name.

* * * * *